(12) United States Patent
Pohl et al.

(10) Patent No.: US 9,061,920 B2
(45) Date of Patent: Jun. 23, 2015

(54) PRECIPITATED MAGNESIUM CARBONATE

(71) Applicants: Michael Pohl, Villach (AT); Christian Rainer, Villach (AT); Markus Esser, Kerpen (DE)

(72) Inventors: Michael Pohl, Villach (AT); Christian Rainer, Villach (AT); Markus Esser, Kerpen (DE)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 13/869,405

(22) Filed: Apr. 24, 2013

(65) Prior Publication Data

US 2014/0004347 A1    Jan. 2, 2014

Related U.S. Application Data

(62) Division of application No. 13/503,525, filed as application No. PCT/EP2010/066664 on Nov. 2, 2010, now Pat. No. 8,551,428.

(60) Provisional application No. 61/280,918, filed on Nov. 10, 2009.

(51) Int. Cl.
| | | |
|---|---|---|
| *C01F 11/18* | (2006.01) | |
| *C01F 5/24* | (2006.01) | |
| *C09C 1/02* | (2006.01) | |
| *C09K 21/02* | (2006.01) | |
| *D21H 17/67* | (2006.01) | |
| *D21H 19/38* | (2006.01) | |

(52) U.S. Cl.
CPC ............ *C01F 5/24* (2013.01); *Y10T 428/2982* (2015.01); *C01F 11/18* (2013.01); *C01F 11/181* (2013.01); *C09C 1/028* (2013.01); *C09K 21/02* (2013.01); *D21H 17/675* (2013.01); *D21H 19/385* (2013.01); *C01P 2002/50* (2013.01); *C01P 2004/61* (2013.01); *C01P 2004/62* (2013.01); *C01P 2006/10* (2013.01); *C01P 2006/12* (2013.01); *C01P 2006/22* (2013.01); *C01P 2006/62* (2013.01); *C01P 2006/64* (2013.01)

(58) Field of Classification Search
USPC .................................................. 423/165, 432
See application file for complete search history.

(56) References Cited

U.S. PATENT DOCUMENTS

| | | | |
|---|---|---|---|
| 935,418 | A | 9/1909 | Sisson |
| 1,361,324 | A | 12/1920 | Grunwald |
| 2,386,389 | A | 10/1945 | Elkington et al. |
| 2,409,297 | A | 10/1946 | McGarvey |
| 2,449,293 | A | 9/1948 | Gloss et al. |
| 3,402,017 | A | 9/1968 | Ruiz |
| 4,456,710 | A * | 6/1984 | Luders et al. ............ 523/200 |
| 4,808,654 | A | 2/1989 | Rolfe et al. |
| 5,057,367 | A | 10/1991 | Morii et al. |
| 5,092,306 | A | 3/1992 | Bokelman |
| 5,253,660 | A | 10/1993 | Dixit et al. |
| 5,298,547 | A * | 3/1994 | Gareiss et al. ............ 524/425 |
| 5,927,288 | A | 7/1999 | Bensalem et al. |
| 5,979,461 | A | 11/1999 | Bensalem et al. |
| 2003/0213937 | A1 * | 11/2003 | Yaniv ............ 252/500 |
| 2007/0194276 | A1 | 8/2007 | Yuan et al. |

FOREIGN PATENT DOCUMENTS

| | | |
|---|---|---|
| CN | 1050411 A | 4/1991 |
| CN | 1508072 A | 6/2004 |
| CN | 101516781 A | 10/2012 |
| EP | 0393813 A1 | 10/1990 |
| EP | 0526121 A1 | 2/1993 |
| EP | 0543262 A1 | 5/1993 |
| EP | 1475351 A1 | 11/2004 |
| GB | 544907 A | 5/1924 |
| GB | 548197 A | 9/1942 |
| GB | 594262 A | 11/1947 |
| GB | 595484 | 12/1947 |
| JP | 200329291 A | 10/2003 |
| JP | 2009147268 A | 7/2009 |
| KR | 20030040953 A | 5/2003 |
| WO | 9709473 A1 | 3/1997 |
| WO | 2009008600 A1 | 1/2009 |

OTHER PUBLICATIONS

Botha et al. "Preparation of a magnesium hydroxy carbonate from magnesium." Hydrometallurgy 62 (2001) pp. 175-183.
Lanas et al. "Dolomitic lime: thermal decomposition of nesquehonite." Thermochimica ACTA, Elsevier Science Publishers, vol. 421, Nos. 1-2, Nov. 2004, pp. 123-132.
International Search Report, dated Jan. 13, 2011 for PCT Application No. PCT/EP2010/066664.
Written Opinion of the International Searching Authority for PCT Application No. PCT/EP2010/066664.
The Communication dated Feb. 23, 2010 for European Application No. 09174954.9-2111.
Office Action dated May 3, 2013 for Chinese Application No. 201080049621.9.
Office Action dated Jul. 30, 2013 for Japanese Application No. 2012-537374.
Office Action dated Jun. 28, 2013 for Korean Application No. 10-2012-7013523.
Office Action dated May 28, 2013 for Taiwanese Application No. 099136892.

* cited by examiner

*Primary Examiner* — Steven Bos
(74) *Attorney, Agent, or Firm* — Amster, Rothstein & Ebenstein LLP (57) ABSTRACT

The present invention relates to a process for preparing hydromagnesite in an aqueous environment. The invention further relates to such hydromagnesite having a specific platy-like morphology in combination with a specific average particle size and to their use as minerals, fillers and pigments in the paper, paint, rubber and plastics industries and to the use as flame-retardant.

32 Claims, 1 Drawing Sheet

PRECIPITATED MAGNESIUM CARBONATE

CROSS-REFERENCE TO RELATED APPLICATIONS

This is a divisional of U.S. application Ser. No. 13/503,525, filed Jun. 29, 2012, which is a U.S. National Phase of PCT Application No. PCT/EP2010/066664, filed Nov. 2, 2010, which claims the benefit of European Application No. 09174954.9, filed Nov. 3, 2009 and U.S. Provisional Application No. 61/280,918, filed Nov. 10, 2009, the contents of which are hereby incorporated herein by reference in their entirety.

FIELD OF THE INVENTION

The present invention relates to a process for preparing hydromagnesite in an aqueous environment. The invention further relates to such hydromagnesite having a platy-like morphology in combination with a specific average particle size and to their use as minerals, fillers and pigments in the paper, paint, rubber and plastics industries and to the use as flame-retardant.

BACKGROUND OF THE INVENTION

Hydromagnesite or basic magnesium carbonate, which is the standard industrial name for hydromagnesite, is a naturally occurring mineral which is found in magnesium rich minerals such as serpentine and altered magnesium rich igneous rocks, but also as an alteration product of brucite in periclase marbles. Hydromagnesite is described as having the following formula:

$$Mg_5(CO_3)_4(OH)_2 \cdot 4H_2O$$

It should be appreciated that hydromagnesite is a very specific mineral form of magnesium carbonate and occurs naturally as small needle-like crystals or crusts of acicular or bladed crystals. In addition thereto, it should be noted that hydromagnesite is a distinct and unique form of magnesium carbonate and is chemically, physically and structurally different from other forms of magnesium carbonate. Hydromagnesite can readily be distinguished from other magnesium carbonates by x-ray diffraction analysis, thermogravimetric analysis or elemental analysis. Unless specifically described as hydromagnesite, all other forms of magnesium carbonates (e.g. artinite ($Mg_2(CO_3)(OH)_2 \cdot 3H_2O$), dypingite ($Mg_5(CO_3)_4(OH)_2 \cdot 5H_2O$), giorgiosite ($Mg_5(CO_3)_4(OH)_2 \cdot 5H_2O$), pokrovskite ($Mg_2(CO_3)(OH)_2 \cdot 0.5H_2O$), magnesite ($MgCO_3$), barringtonite ($MgCO_3 \cdot 2H_2O$), lansfordite ($MgCO_3 \cdot 5H_2O$) and nesquehonite ($MgCO_3 \cdot 3H_2O$)) are not hydromagnesite within the meaning of the present invention and do not correspond chemically to the formula described above.

Besides the natural hydromagnesite, synthetic hydromagnesites (or precipitated magnesium carbonates) can be prepared. For instance, U.S. Pat. Nos. 1,361,324, 935,418, GB 548,197 and GB 544,907 generally describe the formation of aqueous solutions of magnesium bicarbonate (typically described as "$Mg(HCO_3)_2$"), which is then transformed by the action of a base, e.g., magnesium hydroxide, to form hydromagnesite. Other processes described in the art suggest to prepare compositions containing both, hydromagnesite and magnesium hydroxide, wherein magnesium hydroxide is mixed with water to form a suspension which is further contacted with carbon dioxide and an aqueous basic solution to form the corresponding mixture; cf. for example U.S. Pat. No. 5,979,461.

Additionally, general processes for preparing magnesium carbonate are described in the art. For example, EP 0 526 121 describes a calcium-magnesium carbonate composite consisting of calcium carbonate and magnesium carbonate hydroxide and a method for the preparation thereof. Furthermore, GB 594,262 relates to a method and apparatus for treating magnesia-containing materials, such as magnesium and calcium carbonate materials for obtaining respective carbonates in discrete and separate forms, by controlled carbonation such that the magnesium and calcium carbonates may be separated by mechanical means and with attainment of special utilities in separated products. US 2007194276 describes a method of reductively bleaching a mineral slurry comprising adding in the mineral slurry an effective amount of a formamidine sulfinic acid (FAS) and an effective amount of a borohydride to reductively bleach the mineral slurry.

In practice, hydromagnesite is used in huge quantities in the paper, rubber and plastics industries for various purposes such as coatings, fillers, extenders and pigments for papermaking as well as flame-retardants in electrical wires and cables but also to impart resistance to chemicals in fibers. For example, EP 0 543 262, EP 0 393 813, JP 21 50 436, JP 22 55 843, JP 51 70 984, JP 50 98 085 and KR 2003/0040953 describe flame-retardant compositions comprising hydromagnesite in admixture with other magnesium compounds such as huntite, dolomite and/or magnesium hydroxide. In this context, hydromagnesite in combination with various magnesium compounds is usually added into a resin composition for providing flame resistance and high mechanical strength so that such compositions can be used as a covering or insulation material for electric wires or cables, flame arresting materials, wall materials for various areas such as the automotive sector, for the production of housings for electrical appliances or in the building sector.

Another application for hydromagnesite is described in WO 2009/008600 which relates to a spandex fiber containing hydromagnesite and having resistance to chlorine without affecting intrinsic properties of the polyurethane polymer. Furthermore, WO 97/09473 describes spandex containing particles of a mineral mixture of huntite and hydromagnesite, wherein the spandex is described as having decreased tackiness and increased resistance to chlorine-induced degradation. Additionally, hydromagnesite in combination with other magnesium compounds is used in the paper industries in order to impart printability, a high brightness at high opacity but also suitable smoothness and gloss to paper products such as magazines. In this respect, JP 2003/293291 describes coated paper produced by disposing an adhesive and a coating layer consisting mainly of at least one of huntite and hydromagnesite on base paper, wherein the resulting coated paper has high brightness, a high surface-masking effect and excellent printing suitability.

Hydromagnesite and other magnesium compounds, e.g. magnesium carbonate and magnesium hydroxide, can also be incorporated as a filler in wrapping papers of smoking articles such as cigarettes or cigars in order to control many physical properties or characteristics such as the tar delivery per puff, burn rate, puff count, etc. One particularly important aspect of a smoking article that can be controlled by such wrapping paper is the sidestream smoke, which is the smoke given off by the burning end of a smoking article between puffs. However, as such smoke may be objectionable to other people near the smoker several attempts have been made to reduce such sidestream smoke through the use of various magnesium compounds. For example, U.S. Pat. No. 5,092,306 relates to a smoking article wrapper, and in particular, cigarette paper which uses magnesite as a filler composition. Others have used physical mixtures of magnesium hydroxide and hydromagnesite, e.g. U.S. Pat. Nos. 5,927,288 and 5,979,461, while others have made attempts for developing compositions wherein the amount of magnesium hydroxide is reduced by replacing this hydroxide with other magnesium compounds. For example, U.S. Pat. No. 5,253,660 discloses a cigarette or cigar wrapper wherein the paper filler consists of two homogeneously intermixed minerals, namely huntite and hydromagnesite, alone, or admixed with calcium carbonate or magnesium hydroxide or calcium carbonate and magnesium hydroxide and carbon.

However, with respect to the aforementioned possible applications of hydromagnesite, it is to be noted that there are significant constrains regarding the suitability of the corresponding filler particles or their application field. Hydromagnesite obtained from natural sources or prepared by processes described in the prior art for use as filler or coatings in paper applications, in smoking articles and/or as flame retardant usually has an average particle size of about 5 µm or more. In this context, it is to be noted that the thickness of, for example, wrapping papers for smoking articles is generally in the range of about 30 µm, so that the incorporation of hydromagnesite into smoking articles often do not impart the desired properties such as smoothness onto the surface of such articles and, thus, the physical and optical properties of the obtained products are not always satisfactory. Additionally, as well known from kaolin and its use as surface coating and filler in the field of paper applications, the morphology of the particles plays also a decisive role for imparting the desired optical and physical properties such as good printability, high brightness at high opacity, moderate porosity and a favorable smoothness and gloss into paper products such as magazines. For many applications, a platy-like morphology of the particles is highly favorable for obtaining said properties. The provision of platy-like particles having a small particle size would be especially advantageous. In this context, it is further to be noted that a mechanical comminution of particles is usually not a suitable and effective method for obtaining smaller particles of hydromagnesite.

Thus, there is still a need in the art for providing alternative processes for preparing hydromagnesite, wherein such process should be simple and inexpensive and should provide the possibility of controlling particular parameters such as the particle size in combination with the morphology and the density of the obtained particles.

SUMMARY OF THE INVENTION

Accordingly, it is an objective of the present invention to provide an alternative process for preparing hydromagnesite preferably hydromagnesite having a specific platy-like morphology in combination with decreased particle sizes. Another objective of the present invention may be seen in the provision of a process for preparing hydromagnesite having a high absolute density. A further objective of the present invention may be seen in the provision of a process for preparing hydromagnesite having improved optical properties and especially a high degree of whiteness R457. Even a further objective of the present invention may be seen in the provision of a process which can be carried out in a simple way. A still further objective of the present invention may be seen in the provision of a process which can be carried out under mild conditions and the obtained hydromagnesite can be used directly without further complex and costly processing steps. Even another objective of the invention may be seen in the provision of a process, in which hydromagnesite material can be prepared in high yield. Further objects can be gathered from the following description of the invention.

In order to fulfill the foregoing need(s) a process according to the subject-matter as defined herein in claim 1 is provided.

Advantageous embodiments of the inventive method are defined in the corresponding sub-claims and the specification.

According to one aspect of the present application a process for preparing hydromagnesite in an aqueous environment is provided, the process comprising the steps of:
a) providing at least one magnesium oxide source;
b) providing gaseous $CO_2$ and/or carbonate-comprising anions;
c) slaking of said magnesium oxide source of step a) to convert the magnesium oxide at least partially into magnesium hydroxide;
d) contacting the obtained magnesium hydroxide of step c) with said gaseous $CO_2$ and/or carbonate-comprising anions of step b) to convert the magnesium hydroxide at least partially into precipitated nesquehonite; and
e) treating the obtained precipitated nesquehonite of step d) in a heat-aging step.

The inventors surprisingly found that the foregoing process allows for the efficient and controlled production of hydromagnesite. According to the process of the present invention hydromagnesite having a platy-like morphology as well as decreased particle sizes can be provided or prepared directly. More precisely, the inventors found that the morphology as well as the physical values of hydromagnesite being obtained by said process can be improved by specifically controlling or adjusting the process conditions during the preparation of said hydromagnesite. The process involves slaking a magnesium oxide source, like "pure" magnesium oxide, a magnesium oxide containing mineral or another source containing magnesium compounds such as dolomite, which can be used for preparing the magnesium oxide. The resulting magnesium hydroxide in a further process step undergoes a reaction with gaseous carbon dioxide and/or carbonate-comprising anions resulting in precipitated nesquehonite as an intermediate product. The carbonization temperature according to one embodiment of the invention should be controlled and preferably should be below 35° C. Finally, hydromagnesite is directly obtained after transforming said precipitated intermediate product by a heat treatment step. According to one embodiment of the invention, the thus obtained precipitated intermediate product is ground prior to further processing. The hydromagnesite obtained by the inventive process provides several advantageous characteristics, like small particle size in combination with a platy-like morphology and high absolute density.

DETAILED DESCRIPTION OF THE INVENTION

Figure 1:
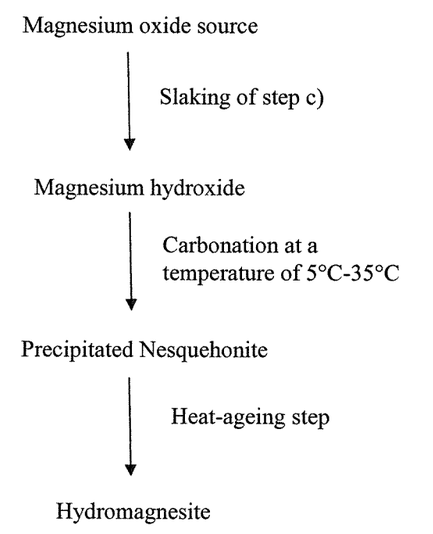
FIG. 1 shows a simplified flow-chart illustrating the process for preparing hydromagnesite according to the process of the present invention.

It should be understood that for the purposes of the present invention, the following terms have the following meanings:

"Hydromagnesite", "basic magnesium carbonate" or "magnesium carbonate hydroxide" in the meaning of the present invention defines a synthetically prepared material of magnesium carbonate with the chemical formula $Mg_5(CO_3)_4(OH)_2 \cdot 4H_2O$.

"Nesquehonite" in the meaning of the present invention defines a synthetically prepared material of magnesium carbonate with the chemical formula $MgCO_3 \cdot 3H_2O$ or $Mg(HCO_3)(OH) \cdot 2H_2O$.

The term "precipitation" in the meaning of the present invention refers to the formation of a solid material in a solution during a chemical reaction.

A "suspension" or "slurry" in the meaning of the present invention comprises insoluble solids and water and optionally further additives and usually contains large amounts of solids and, thus, is more viscous and generally of higher density than the liquid from which it is formed.

The term "slaking" or "slake" in the meaning of the present invention refers to the hydration of magnesium oxide by contacting said compounds with water or moisture.

The term "calcining" in the meaning of the present invention refers to a thermal treatment process applied to solid materials causing loss of moisture, reduction or oxidation, and the decomposition of carbonates and other compounds resulting in an oxide of the corresponding solid material.

The term "carbonation" in the meaning of the present invention refers to a process in which at least one hydroxide group is replaced by carbonate.

The term "heat-aging" in the meaning of the present invention relates to a thermal treatment process in which crystals having initially a higher internal energy state undergo a phase transformation by dissolving and redepositing into crystals having a lower internal energy state.

According to another aspect of the present invention, hydromagnesite is provided, wherein said hydromagnesite is obtainable by the inventive process for preparing hydromagnesite. The hydromagnesite preferably has a platy-like morphology in combination with a decreased particle size and improved physical and optical properties. According to a further aspect, said hydromagnesite obtainable by the process of the present invention has an increased density. According to another aspect, the present invention refers to the use of said hydromagnesite as mineral, filler and pigment in paper, paint, rubber and plastics applications and to its use as flame-retardant.

According to one preferred embodiment of the present invention, the at least one magnesium oxide source comprises magnesium oxide, magnesite, dolomite, huntite, magnesium carbonate, magnesium hydroxide, brucite or mixtures thereof.

According to another preferred embodiment of the inventive process, the gaseous $CO_2$ comes from an external $CO_2$ supply or from the recirculation of $CO_2$ or both.

According to yet another preferred embodiment of the inventive process, the carbonate-comprising anions are selected from the group consisting of sodium carbonate, potassium carbonate, sodium hydrogen carbonate, potassium hydrogen carbonate or mixtures thereof.

According to one preferred embodiment of the inventive process, the starting temperature of step d) is adjusted to a temperature of between 5° C. and 35° C. and most preferably to a temperature of between 10° C. and 30° C.

According to another preferred embodiment of the present invention, the heat-aging step of step e) is carried out at a temperature of at least 90° C., preferably in the range between 90° C. and 150° C., more preferably at a temperature of between 110° C. and 140° C., even more preferably at a temperature of between 120° C. to 135° C. and most preferably at a temperature of about 130° C.

According to yet another preferred embodiment of the present invention, the heat-aging step is carried out for a period of time of 20 min to 60 min, preferably for a period of time of 20 min to 40 min and most preferably for a period of time of 25 to 35 min.

According to one preferred embodiment of the present invention, the precipitated nesquehonite obtained in step d) is ground prior to the heat-aging step of step e).

According to another preferred embodiment of the present invention, the precipitated nesquehonite obtainable after the grinding comprises particles of which at least 50% by weight have an average particle size of less than 25 µm, more preferably of less than 20 µm, even more preferably of less than 15 µm and most preferably of less than 10 µm.

According to yet another preferred embodiment of the present invention, the hydromagnesite obtainable by the process has a specific BET surface area of 10 m²/g to 150 m²/g, more preferably of 10 m²/g to 100 m²/g and most preferably of 20 m²/g to 70 m²/g.

According to one preferred embodiment of the present invention, the hydromagnesite obtainable by the process has a degree of whiteness R457 of at least 80%, more preferably of at least 85%, even more preferably of between 85% and 99% and most preferably of between 85% and 99%.

According to another preferred embodiment of the present invention, the hydromagnesite obtained by the process comprises particles having an average particle size $d_{50}$ of less than 20 µm, preferably of less than 15 µm, more preferably of less than 10, and most preferably of less than 5 µm.

According to yet another preferred embodiment of the present invention, the hydromagnesite obtained by the process is further treated with fatty acids, preferably selected from the group consisting of one or more fatty acids selected from stearic acid, palmitic acid, behenic acid, montanic acid, capric acid, lauric acid, myristic acid, isostearic acid and cerotic acid.

As set out above, the inventive process for preparing hydromagnesite having improved optical and physical properties comprises the steps a), b), c), d) and e). In the following, it is referred to further details of the present invention and especially the foregoing steps of the inventive process for preparing magnesium carbonate suspensions having a specific morphology in combination with decreased particle size as well as excellent optical and physical properties. Those skilled in the art will understand that many embodiments described herein can be combined or applied together.

Characterization of Step a): Provision of a Magnesium Oxide Source

According to step a) of the process of the present invention, at least one magnesium oxide source is provided.

The at least one magnesium oxide source in the meaning of the present invention refers to magnesium oxide; and/or a material in which magnesium oxide naturally occurs; and/or a material in which at least one magnesium compound occurs which can be converted into magnesium oxide.

Accordingly, the at least one magnesium oxide source is preferably selected from magnesium oxide, magnesium oxide containing minerals, magnesium containing materials and mixtures thereof. Preferred magnesium oxide sources are magnesite and dolomite, for which a calcining step is needed to convert the contained magnesium compounds into the desired magnesium oxide.

In the case where the at least one magnesium oxide source is selected from magnesium oxide, said magnesium oxide is preferably in the form of a powder having a magnesium oxide content of more than 95 wt.-% and more preferably of more than 98 wt.-%, based on the weight of the powder. In a preferred embodiment, the particles of magnesium oxide in the powder are of small particle sizes; i.e. the particles of magnesium oxide have an average particle size $d_{99}$ value of less than 100 µm and a $d_{95}$ value of less than 75 µm, as determined by laser diffraction using the instrument CILAS 920 particle-size-analyzer of CILAS, Orleans, France.

A material in which a form of magnesium oxide naturally occurs is understood to be a magnesium oxide containing mineral. An example of such magnesium oxide rich mineral is represented for example by periclase, which occurs naturally in contact metamorphic rocks and is a major component of most basic refractory bricks.

By contrast, a material from which magnesium oxide can be synthetically obtained, i.e. can be converted into magnesium oxide may be any magnesium containing material, for example, materials comprising magnesium hydroxide and/or magnesium carbonate. If the at least one magnesium oxide source is a magnesium containing material, said material comprises the magnesium compound(s) preferably in an amount of at least 15 wt.-%, more preferably of at least 25 wt.-% and most preferably of at least 40 wt.-% based on the total weight of the magnesium containing material.

In the case where the at least one magnesium oxide source is a magnesium containing material, said material is preferably selected from magnesium carbonate, magnesium hydroxide, magnesite, brucite, dolomite, huntite, magnesium chloride rich brine, seawater from which magnesium oxide can be obtained and mixtures thereof. In this context, the term "magnesium carbonate" according to the present invention comprises anhydrous magnesium carbonate as well as forms of magnesium carbonate comprising crystal water (hydrate).

According to the present invention, the magnesium oxide source of step a) of the process of the present invention is not restricted to the specific minerals and/or materials described above. Rather any mineral and/or material can be used provided that said mineral and/or material comprises a sufficient amount of magnesium oxide and/or a corresponding magnesium oxide containing mineral and/or a material or mineral which can be at least partially converted into magnesium oxide.

Said at least partial conversion of a magnesium compound into magnesium oxide is preferably carried out by calcining said materials. Said calcining step can be carried out by any conventional calcining process known to the skilled person.

In one preferred embodiment, the at least one magnesium oxide source is magnesite ($MgCO_3$), which is a frequently occurring mineral merely exclusively consisting of anhydrous magnesium carbonate. Such material in the meaning of the present invention would be regarded as magnesium containing material. Said magnesite is preferably calcined at temperatures of about 600° C. to 900° C. in order to obtain magnesium oxide in the form of caustic calcined magnesite. The obtained particles of caustic calcined magnesite are characterized by their high porosity and possess a high reactivity due to their large inner surface and, thus, are especially suitable for the purposes of the present invention. Alternatively or additionally, other forms of magnesium carbonate, for example, synthetically prepared magnesium carbonate in the anhydrous form and/or forms comprising crystal water and/or other naturally occurring forms of magnesium carbonate may also be used for providing the at least one magnesium oxide source. The magnesium carbonates may also be calcined under the same conditions as applied for magnesite in order to convert these magnesium carbonates at least partially into magnesium oxide.

Preferably, the obtained caustic calcined magnesite has a content of magnesium oxide of more than 85 wt.-%, more preferably more than 90 wt.-% and most preferably of more than 92 wt.-%, based on the total weight of the caustic calcined magnesite. In a preferred embodiment, said caustic calcined magnesite has a content of magnesium oxide of between 90 wt.-% and 99 wt.-% and most preferably of between 92 wt.-% and 98 wt.-%, based on the total weight of the caustic calcined magnesite. Magnesium oxide obtained from other magnesium carbonates has preferably a content of magnesium oxide of more than 90 wt.-%, for example in the range between 95 wt.-% and 99 wt.-%, based on the total weight of the magnesium oxide.

The particles of the caustic calcined magnesite and/or magnesium oxide obtained from other forms of magnesium carbonate preferably have a particle size distribution as conventionally employed for the material(s) involved in a corresponding process for converting a magnesium oxide source at least partially into magnesium hydroxide as used in step c) of the process of the present invention. In general, the caustic calcined magnesite particles and/or particles of magnesium oxide obtained from other forms of magnesium carbonate have an average particle size $d_{50}$ value of from 1 µm to 100 µm, preferably from 5 µm to 50 µm and most preferably from 10 µm to 25 µm, for example between 15 µm and 20 µm, as determined by laser diffraction using the instrument CILAS 920 particle-size-analyzer of CILAS, Orleans, France.

As used herein and as generally defined in the art, the $d_{50}$ value is defined as the size at which 50% (the median point) of the particle mass is accounted for by particles having a particle size equal to the specified value.

In the case where the magnesium containing material is magnesium hydroxide or a material comprising a high magnesium hydroxide content, said material may be directly subjected to step d) of the process of the present invention. Alternatively or additionally, said magnesium containing material may be first subjected to the slaking of step c) of the process of the present invention.

In another preferred embodiment, the at least one magnesium oxide source is dolomite which is merely composed of calcium magnesium carbonate ($CaMg(CO_3)_2$) and thus representing a magnesium containing mineral. For the purposes of the present invention, any available variety of dolomite can be used as the at least one magnesium oxide source. However, in one preferred embodiment, the dolomite is white dolomite representing a relatively pure dolomite which may be e.g. obtained or extracted from Norwegian Talc's Hammerfall deposits. In order to convert the magnesium compound, i.e. the carbonates, contained in said dolomite at least partially into magnesium oxide, the dolomite is preferably calcined at high temperatures, wherein said calcining step can be carried out by any conventional calcining process known to the skilled person.

In one preferred embodiment, the dolomite is calcined at temperatures of between 900° C. and 1200° C. and more preferably at a temperature of between 1000° C. and 1100° C. in order to obtain burned dolomite (MgO.CaO). Alternatively, the dolomite is calcined at temperatures of between 600° C. and 900° C., more preferably of between 600° C. and 800° C. and most preferably at a temperature of about 750° C. in order to obtain half-burned dolomite ($MgO.CaCO_3$). The chemical characteristics such as reactivity of the half-burned or burned dolomite, i.e. of the obtained magnesium oxide, depend mainly on the temperatures and calcining processes used which are well known to the skilled person. For instance, if the dolomite is calcined at a temperature in the range of 1000°

C. to 1100° C. in order to obtain burned dolomite, said temperature is preferably maintained for a period of time of between 30 min to 120 min and most preferably for a period of time of between 45 min and 90 min, for example for about 60 min.

The dolomite subjected to the calcining process has preferably a size distribution as conventionally employed for the material(s) involved in a corresponding calcining process for obtaining burned or half-burned dolomite. In this context, it is to be noted that dolomite as well as other magnesium containing materials such as for example magnesite used as the at least one magnesium oxide source according to the present invention are usually in the form of rocks and grains of various sizes. For obtaining a sufficient amount of magnesium oxide having a sufficient high reactivity and/or a sufficient specific surface area, said rocks and/or grains are preferably comminuted by a mechanical processing step prior to calcining said magnesium rich materials resulting in a reduction of the original grain size. As a result of the comminution, the mean grain size of the obtained particles are preferably in the range of 1 mm to 250 mm, preferably in the range of 1 mm to 150 mm, even more preferably in the range of 1 mm to 100 mm and most preferably in the range of 1 mm to 75 mm. In one preferred embodiment, said particles have preferably a mean grain size in the range between 10 mm and 50 mm, as measured by screening on analytical test sieves from Retsch®, Germany and determining mass fractions of selected size ranges.

Such comminution steps may, for example, be performed under conditions such that refinement predominantly results from impacts with a secondary body, i.e. in one or more of a vertical bead mill, a ball mill, a rod mill, a vibrating mill, a roll crusher, a centrifugal impact mill, an attrition mill, a pin mill, a hammer mill, a pulveriser, a shredder, a de-clumper, a knife cutter, or other such equipment known to the skilled person, or may be performed under conditions such that autogenous grinding takes place. In one preferred embodiment, such comminution step is carried out by grinding rocks and grains of, for example, dolomite by using a ball mill. In the case where magnesium containing materials have been calcined and are subsequently used as the corresponding magnesium oxide source in step c) of the process of the present invention, said step of comminution may, alternatively or additionally, be carried out after said magnesium containing material has been calcined, i.e. prior to step c) of the process of the present invention. If magnesium oxide and/or magnesium oxide containing minerals are used as the at least one magnesium oxide source, such step of comminution may be also performed prior to step c) of the process of the present invention. Such comminution prior to step c) of the process of the present invention is preferably carried out if there is a particle size distribution of the magnesium oxide source which is considered too broad and/or if the median diameter of the magnesium oxide source is above 150 µm. Accordingly, the particles of the magnesium oxide source used in step c) of the process of the present invention are preferably of an average particle size $d_{50}$ value of from 1 µm to 150 µm, more preferably from 5 µm to 100 µm and most preferably from 10 µm to 75 µm, as measured by laser diffraction using the instrument CILAS 920 particle-size-analyzer of CILAS, Orleans, France Characterization of Step b): Providing Gaseous $CO_2$ and/or Carbonate-comprising Anions According to step b) of the process of the present invention, gaseous $CO_2$ and/or carbonate-comprising anions are provided.

The carbon dioxide provided in step b) may be any form of gaseous $CO_2$, for example, carbon dioxide, a carbon dioxide containing gas or carbonic acid, i.e. carbon dioxide dissolved in water.

In one preferred embodiment, the gaseous $CO_2$ is derived from the gaseous effluent obtained by calcining various magnesium oxide sources provided in step a) of the same process, i.e. the gaseous carbon dioxide is supplied by the recirculation of $CO_2$. By calcining of such sources such as magnesium carbonate, for example, in the form of magnesite, a rising temperature during the calcining process increases the amount of carbon dioxide gas released during the process. Preferably, the generated carbon dioxide is vented out of the reaction vessel as the obtained magnesium oxide has an affinity to absorb moisture as well as carbon dioxide, so that said compound undergoes the reaction back to the magnesium carbonate. Such gases contain approximately 5% to 40% by volume of $CO_2$ and are preferably used after purification and, optionally up-concentration or dilution of the gaseous effluent.

Additionally or alternatively, the carbon dioxide can be supplied from an external source such as from a steel cylinder or from flue gases and/or exhaust gases of industrial processes using furnaces and kilns and/or from suitable reactions of carbonate salts with acids etc. However, it is to be noted that the carbon dioxide source provided in step b) of the inventive process is not particularly limited provided said source contains no reactive gas. The gaseous carbon dioxide of step b) may be provided in a concentrated form or in a diluted form. If the gaseous carbon dioxide is provided in a diluted form, the carbon dioxide is preferably provided in admixture with air or the like.

In this case, the gaseous carbon dioxide provided in step b) of the process of the present invention has, in terms of volume, a concentration in, for example, air of less than 40 vol.-%, more preferably less than 35 vol.-% and most preferably between 10 vol.-% and 30 vol.-% based on the total volume of the gaseous composition. The minimum carbon dioxide content in the carbon dioxide source may be about 8 vol.-%, based on the total volume of the gaseous composition.

Additionally or alternatively, carbonate-comprising anions are provided in step b) of the process of the present invention. The carbonate-comprising anions of step b) may be provided in any form of carbonate salts which are soluble in water, i.e. dissolve in water to form a homogeneous solution. In one preferred embodiment, carbonate-comprising anions refer to carbonate salts, which when mixed with deionised water provide a solubility of more than 50 g/l at 20° C., preferably of more than 100 g/l at 20° C., more preferably of more than 150 g/l at 20° C. and most preferably of more than 200 g/l at 20° C.

Accordingly, the carbonate-comprising anions of step b) are preferably selected from the group comprising alkali carbonates and/or alkali hydrogen carbonates, wherein the alkali ion of the alkali carbonate and/or alkali hydrogen carbonate is selected from sodium, potassium and mixtures thereof. Sodium carbonate, potassium carbonate, sodium hydrogen carbonate, potassium hydrogen carbonate and mixtures thereof are preferred carbonate-comprising anions of step b) of the process of the present invention. In one preferred embodiment, the carbonate-comprising anions are sodium carbonate.

In the context of the present invention, the term "sodium carbonate" shall include sodium carbonate in the anhydrous form as well as forms comprising crystal water (hydrate). In one preferred embodiment, the sodium carbonate of the present invention is anhydrous sodium carbonate ($Na_2CO_3$) or sodium carbonate decahydrate ($Na_2CO_3 \cdot 10H_2O$).

The term "potassium carbonate" also refers to potassium carbonate in the anhydrous form as well as forms comprising crystal water (hydrate). Preferably, the potassium carbonate of the present invention is anhydrous potassium carbonate ($K_2CO_3$).

In the context of the present invention, the term "sodium hydrogen carbonate" shall include sodium hydrogen carbonate in the anhydrous form as well as forms comprising crystal water (hydrate). Preferably, the sodium hydrogen carbonate of the present invention is anhydrous sodium hydrogen carbonate ($NaHCO_3$).

In the context of the present invention, the term "potassium hydrogen carbonate" shall also include potassium hydrogen carbonate in the anhydrous form as well as forms comprising crystal water (hydrate). Preferably, the potassium hydrogen carbonate of the present invention is anhydrous potassium hydrogen carbonate ($KHCO_3$).

In case carbonate-comprising anions are provided in step b) of the process of the present invention, said carbonate-comprising anions can be provided in any appropriate solid form, e.g. in the form of granules or a powder. Alternatively, said carbonate-comprising anions can be provided in the form of a suspension or solution.

Characterization of Step c): Slaking of Said Magnesium Oxide Source of Step a)

According to step c) of the process of the present invention, said at least one magnesium oxide source of step a) is slaked to convert at least a part of the magnesium oxide into magnesium hydroxide.

"Slaking" in the meaning of the present invention refers to a process in which magnesium oxide is hydrated. Thus, the term "slaking" refers to a process of adding water to magnesium oxide to produce magnesium hydroxide. Accordingly, the particles of magnesium oxide of the at least one magnesium oxide source provided in step a) are hydrated in a slaking process, which is carried out by contacting the magnesium oxide of the at least one magnesium oxide source with water. According to the inventive process the magnesium oxide is at least partially converted into magnesium hydroxide.

The water to be used in the slaking process of step c) may be any water available such as tap water and/or deionised water. Preferably, the water used for slaking the at least one magnesium oxide source of step a) is tap water.

In one preferred embodiment of the present invention, the at least one magnesium oxide source of step a) is added to the water in one portion and/or continuously over a period of 1 h or less, preferably over a period of 45 min or less, more preferably over a period of 30 min or less and most preferably over a period of 15 rain or less to yield or provide a suitable solid content in the resulting suspension. In another preferred embodiment, the at least one magnesium oxide source of step a) is added to water over a period of 10 min or less to a suitable solid content in the resulting suspension. In a further preferred embodiment of the present invention, the at least one magnesium oxide source of step a) is added to the water in several portions to a suitable solid content in the resulting suspension, preferably in two to five portions, more preferably in two to four portions, even more preferably in two to three portions and most preferably in two portions.

In the case where the at least one magnesium oxide source of step a) is added to the water in several portions, the at least one magnesium oxide source of step a) is preferably added in about equal portions to the water. As an alternative, it is also possible to add the at least one magnesium oxide source of step a) in unequal portions to the water, i.e. in larger and smaller portions. In one preferred embodiment, the larger portion is added first followed by the addition of the smaller portion of the at least one magnesium oxide source to the resulting suspension in order to slake or hydrate the at least one magnesium oxide source provided in step a). In another preferred embodiment, the smaller portion of the at least one magnesium oxide source of step a) is added first followed by the addition of the larger portion to the water in order to convert the at least one magnesium oxide source of step a) at least partially into magnesium hydroxide.

The ratio of the at least one magnesium oxide source of step a) to water is preferably adjusted in such a way that the suspension develops a sufficient or suitable viscosity. In one preferred embodiment, a considerable excess of water is used, so that the ratio of water to the at least one magnesium oxide source in the suspension is such that the ratio (volume of water):(volume of the at least one magnesium oxide source) is from 40:1 to 3:1, more preferably from 30:1 to 3:1 and most preferably from 20:1 to 3:1. For example, if the at least one magnesium oxide source is selected from caustic calcined magnesite, the ratio of water to the caustic calcined magnesite in the suspension may be such that the ratio (volume of water):(volume of caustic calcined magnesite) is from 40:1 to 5:1, more preferably from 30:1 to 10:1 and most preferably from 20:1 to 15:1. In case where the at least one magnesium oxide source of step a) is selected from burned dolomite, the ratio of water to the burned dolomite in the suspension may be such that the ratio (volume of water):(volume of burned dolomite) is from 30:1 to 3:1, more preferably from 20:1 to 3:1 and most preferably from 10:1 to 3:1. In another preferred embodiment, the resulting aqueous suspension comprising water and the at least one magnesium oxide source provided in step a) has a solid content of between 1 wt.-% and 20 wt.-% and most preferably between 1.5 wt.-% and 17.5 wt.-%, based on the total weight of the suspension.

In one preferred embodiment, said suspension has a lower solid content if the at least one magnesium oxide source provided in step a) has higher magnesium oxide content. The term "high content" in the meaning of the present invention refers to an amount of magnesium oxide or magnesium compound which can be converted into magnesium oxide in the corresponding magnesium oxide source of at least 70 wt.-%, based on the total dry weight of the magnesium oxide source. For example, if the at least one magnesium oxide source provided in step a) is magnesium oxide and/or a magnesium oxide containing mineral having a high content of magnesium oxide and/or a magnesium containing material having a high content of a magnesium compound which can be converted into magnesium oxide, the solid content in the suspension may be in the range between 1 wt.-% and 15 wt.-%, more preferably in the range between 1.5 wt.-% and 12.5 wt.-% and most preferably in the range between 2 wt.-% and 10 wt.-% based on the total weight of the suspension. Such solid content is preferably adjusted if the at least one magnesium oxide source provided in step a) is selected from magnesium oxide, periclase, magnesite, magnesium carbonate, magnesium hydroxide and mixtures thereof. For instance, if the at least one magnesium oxide source provided in step a) is caustic calcined magnesite obtained by calcining magnesite, the solid content in the suspension is preferably in the range between 1 wt.-% and 12.5 wt.-%, more preferably in the range between 1.5 wt.-% and 10 wt.-%, even more preferably in the range between 2 wt.-% and 7.5 wt.-% and most preferably in the range between 4 wt.-% and 6 wt.-%, for example between 4.5 wt.-% and 5.5 wt.-% based on the total weight of the suspension.

In another preferred embodiment, said suspension may have a higher solid content if the at least one magnesium oxide source provided in step a) has a lower magnesium oxide content. The term "low content" in the meaning of the present invention refers to an amount of magnesium oxide or magnesium compound which can be converted into magnesium oxide in the corresponding magnesium oxide of less than 70 wt.-%, based on the total dry weight of the magnesium oxide source. For example, if the at least one magnesium oxide source provided in step a) is a magnesium oxide containing mineral having a low content of magnesium oxide and/or a magnesium containing material having a low content of a magnesium compound which can be converted into magnesium oxide, the solid content in the suspension may be in the range between 10 wt.-% and 20 wt.-%, more preferably in the range between 10 wt.-% and 17.5 wt.-% and most preferably in the range between 12.5 wt.-% and 17.5 wt.-% based on the total weight of the suspension. Such solid content is preferably adjusted if the at least one magnesium oxide source provided in step a) is selected from dolomite, huntite and mixtures thereof. For example, if the at least one magnesium oxide source provided in step a) is burned dolomite obtained by calcining dolomite, the solid content in the suspension is preferably in the range between 10 wt.-% and 20 wt.-%, more preferably in the range between 12.5 wt.-% and 17.5 wt.-% and most preferably in the range between 15 wt.-% and 17.5 wt.-%, for example between 16 wt.-% and 17 wt.-% based on the total weight of the suspension.

Depending on equipment and site conditions, the slaking process is preferably carried out with water having an elevated temperature in order to provide small particles of magnesium hydroxide having a high specific surface and additionally or alternatively in order to obtain a sufficient reaction rate. Furthermore, as the incoming water temperature may inversely affect the time required for carrying out the slaking process, a contacting of the at least one magnesium oxide source with cool water should preferably be avoided. In the case in which cool water and magnesium oxide come in contact a condition called "drowning" may take place, resulting in particles of magnesium hydroxide which are very coarse and not very reactive. Therefore, the temperature of the water used in the slaking process should preferably be above room temperature but below the boiling point of water.

In one preferred embodiment, the temperature of the water added into the reaction vessel for slaking said at least one magnesium oxide source provided in step a) is preferably in the range between 20° C. and 90° C., more preferably in the range between 30° C. and 60° C. and most preferably in the range between 35° C. and 55° C. for example 40° C. or 50° C.

For example, if the at least one magnesium oxide source provided in step a) is caustic calcined magnesite obtained by calcining magnesite, said temperature is preferably in the range between 20° C. and 45° C., more preferably in the range between 25° C. and 45° C. and most preferably in the range between 35° C. and 45° C., for example about 40° C. In the case where the at least one magnesium oxide source provided in step a) is burned dolomite obtained by calcining dolomite, said temperature is preferably in the range between 35° C. and 60° C., more preferably in the range between 40° C. and 55° C. and most preferably in the range between 45° C. and 55° C., for example about 50° C.

During the slaking process the temperature in the reaction vessel varies due to variation in water temperature, magnesium oxide reactivity, and quality of water and, thus, the temperature of the suspension may be adjusted frequently. Preferably, the temperature is controlled continuously. Alternatively, the temperature may be controlled repeatedly. In another preferred embodiment, the temperature of the suspension is not adjusted during step c) of the process of the present invention is carried out.

In one preferred embodiment, the slaking process of step c) is carried out by agitation of the suspension. In this respect, agitation can be carried out continuously or discontinuously. However, as the degree of agitation during the slaking process may have an impact on the obtained magnesium hydroxide, the suspension is preferably agitated continuously. In this respect, too little agitation may result in uneven temperature within the suspension resulting in hot and cold spots. Such uneven temperature may result in crystals of large size and reduced surface area and agglomeration of particles, while cold spots will result in either drowning or higher amounts of unhydrated particles of magnesium oxide.

The slaking process of step c) of the process of the present invention is preferably conducted to the point where at least a part of the magnesium oxide contained in the at least one magnesium oxide source is converted to its respective hydroxides, i.e. magnesium hydroxide. In this respect, it is to be noted that only a portion of the magnesium oxide contained in the at least one magnesium oxide source is converted into the respective magnesium hydroxide during the slaking process of step c). For example, if the at least one magnesium oxide source is contacted for about 15 min with the slaking water having a temperature of about 40° C., the amount of magnesium oxide converted into magnesium hydroxide is in the range between 5 wt.-% and 15 wt.-%, for example about 10 wt.-%, i.e. the magnesium oxide content is in the range between 85 wt.-% and 95 wt.-%, for example about 90 wt.-%, based on the total weight of magnesium oxide and magnesium hydroxide. By contrast, if the at least one magnesium oxide source is contacted for about 30 min with the slaking water having a temperature of about 40° C., the amount of magnesium oxide converted into magnesium hydroxide is in the range between 15 wt.-% and 25 wt.-%, for example about 20 wt.-%, i.e. the magnesium oxide content is in the range between 75 wt.-% and 85 wt.-%, for example about 80 wt.-%, based on the total weight of magnesium oxide and magnesium hydroxide.

The mixture of the at least one magnesium oxide source and magnesium hydroxide obtained by slaking said magnesium oxide source of step a) at a water temperature of 40° C. and a slaking period of 30 min may have a ratio (weight of magnesium oxide):(weight of magnesium hydroxide) which is preferably from 10:1 to 2:1, more preferably from 8:1 to 3:1 and most preferably from 6:1 to 3:1. In this context, it is to be noted that after conversion or reaction of the obtained magnesium hydroxide with the gaseous carbon dioxide and/or carbonate-comprising anions of step b), further magnesium oxide of the at least one magnesium oxide source of step a) in the mixture is converted into magnesium hydroxide which then can also be reacted with carbon dioxide and/or carbonate-comprising anions. In other words, the inventive process can be carried out with a mixture of magnesium oxide and magnesium hydroxide (which may be obtained by a partial slaking reaction) since the remaining magnesium oxide is successively converted into the magnesium hydroxide after the magnesium hydroxide already contained in the starting mixture reacted with the gaseous carbon dioxide and/or carbonate-comprising anions of step b). The at least one magnesium oxide source of step a) may be added into the water for carrying out the slaking of step c) of the present invention in several portions and/or continuously over the time desired for carrying out the process of the present invention and/or until the desired amount of resulting product is obtained. In said process the amount of water may be adjusted frequently in order to obtain a solid content and/or viscosity suitable for carrying out the process of the present invention.

It is to be noted that in the case where a magnesium oxide containing mineral having a low content of magnesium oxide and/or a magnesium containing material having a low content of a magnesium compound which can be converted into magnesium oxide is used as the magnesium oxide source provided in step a), said mineral and/or material usually comprises a content of magnesium oxide and/or of a magnesium compound which can be converted into magnesium oxide of less than 70 wt.-%, based on the total dry weight of the magnesium oxide source; i.e. the original material further comprises other compounds such as carbonates, oxides, hydroxides etc. of alkali metals and/or alkaline earth metals.

For example, if the at least one magnesium oxide source provided in step a) is dolomite, said mineral is merely made of magnesium carbonate and calcium carbonate. However, natural products of dolomite possess not only varying compositions regarding the specific compounds but also varying compositions regarding the ratios of said magnesium and calcium carbonates which occur in a wide range. The ratio of magnesium carbonate to calcium carbonate in naturally occurring dolomite is usually such that the ratio (weight of magnesium carbonate):(weight of calcium carbonate) is from 2:1 to 1:2, more preferably 1.5:1 to 1:1.5 and most preferably about 1:1.

Thus, by using dolomite as the magnesium oxide source of step a), the calcining step carried out prior to the slaking of step c) does not only result in the conversion of magnesium carbonate into magnesium oxide but also in the conversion of calcium carbonate into calcium oxide in the corresponding ratios depending on the dolomite used. In the case where such a mixture of obtained magnesium oxide and calcium oxide is slaked by step c), said slaking converts the magnesium oxide at least partially into magnesium hydroxide and in addition thereto, the calcium oxide is almost completely converted into calcium hydroxide; i.e. by slaking of burned dolomite in step c) of the process of the present invention, a mixture comprising magnesium hydroxide, calcium hydroxide, magnesium oxide and calcium oxide is obtained. The term "almost completely converted" in the meaning of the present invention refers to a reaction in which at least 99 wt.-%, more preferably at least 99.2 wt.-% and most preferably at least 99.5 wt.-% of a compound is converted into the respective reaction product. For example, if a mixture of magnesium oxide and calcium oxide is slaked by step c), said slaking converts at least 99 wt.-% of calcium oxide, more preferably at least 99.2 wt.-% and most preferably at least 99.5 wt.-%, based on the total dry weight of the calcium oxide, into calcium hydroxide, while the magnesium oxide is only partially converted into magnesium hydroxide.

The time required for carrying out the slaking process of step c) is the time required to obtain a sufficient amount of magnesium hydroxide by the hydration/slaking of the at least one magnesium oxide source for carrying out step d) of the process of the present invention. This time depends mainly on the at least one magnesium oxide source provided in step a).

In a preferred embodiment, the at least one magnesium oxide source provided in step a) is slaked for a shorter period of time if the at least one magnesium oxide source of step a) is in the form of magnesium oxide and/or a magnesium oxide containing mineral having a high content of magnesium oxide and/or a magnesium containing material having a high content of a magnesium compound which can be converted into magnesium oxide. Said period of time is preferably in the range between 5 min and 30 min, more preferably in the range between 5 min and 20 min and most preferably in the range between 10 min and 20 min. Such shorter period of time is preferably applied for the slaking step if the at least one magnesium oxide source provided in step a) is selected from magnesium oxide, periclase, magnesite, magnesium carbonate, magnesium hydroxide and mixtures thereof. For instance, if the at least one magnesium oxide source provided in step a) is caustic calcined magnesite obtained by calcining magnesite, said period of time is preferably in the range between 10 min and 30 min, more preferably in the range between 10 min and 25 min and most preferably in the range between 10 min and 20 min, for example about 15 min.

In another preferred embodiment, the at least one magnesium oxide source provided in step a) is slaked for a longer period of time if the at least one magnesium oxide source provided in step a) is a magnesium oxide containing mineral having a low content of magnesium oxide and/or a magnesium containing material having a low content of a magnesium compound which can be converted into magnesium oxide. Said period of time is preferably in the range between 5 min and 60 min, more preferably in the range between 10 min and 45 min and most preferably in the range between 20 min and 40 min. Such longer period of time is preferably applied if the at least one magnesium oxide source provided in step a) is selected from dolomite, huntite and mixtures thereof. For example, if the at least one magnesium oxide source provided in step a) is burned dolomite obtained by calcining dolomite, said period of time is preferably in the range between 15 min and 50 min, more preferably in the range between 15 min and 45 min and most preferably in the range between 25 min and 40 min, for example about 30 min.

After carrying out step c) of the present invention, the obtained mixture of magnesium hydroxide and magnesium oxide is formed into a suitable suspension for carrying out step d). The overall solid content of this suspension is preferably in the range between 1 wt.-% and 20 wt.-%, more preferably between 1 wt.-% and 15 wt.-% and most preferably between 2 wt.-% and 10 wt.-%, based on the total weight of the suspension obtained in step c). For example, if the magnesium hydroxide is obtained from magnesite as the at least one magnesium oxide source, said overall solid content of the suspension is preferably in the range between 2 wt.-% and 8 wt.-%, more preferably in the range between 3 wt.-% and 7 wt.-% and most preferably in the range between 4 wt.-% and 6 wt.-%, for example about 5 wt.-%, based on the total weight of the suspension obtained in step c). If the magnesium hydroxide is obtained from dolomite as the at least one magnesium oxide source, said overall solid content of the suspension is preferably in the range between 5 wt.-% and 10 wt.-%, more preferably in the range between 6 wt.-% and 10 wt-% and most preferably in the range between 7 wt.-% and 9 wt.-%, for example about 8 wt.-%, based on the total weight of the suspension obtained in step c).

Additionally or alternatively, the obtained suspension comprising magnesium hydroxide and magnesium oxide has preferably a viscosity of less than 1.000 mPa·s and more preferably of less than 100 mPa·s, as measured with a Brookfield DV-II Viscometer at a speed of 100 rpm and equipped with a LV-3 spindle. In the case where the obtained suspension has a solid content above or below the desired range and/or the viscosity of said suspension is too high or low the suspension may be diluted with water or up-concentrated by any conventional process known to the skilled person to obtain a suspension of said desired solid content and/or viscosity for the further process steps.

The obtained suspension comprising magnesium hydroxide and magnesium oxide has preferably a pH of more than 8, more preferably of more than 9 and most preferably of more than 10, as measured according to the measurement method described in the Examples section here below.

Characterization of Step d): Contacting the Obtained Magnesium Hydroxide with Said Gaseous $CO_2$ and/or Carbonate-comprising Anions According to step d) of the process of the present invention, said obtained magnesium hydroxide of step c) is contacted with said gaseous carbon dioxide and/or carbonate-comprising anions of step b) to convert at least a part of the magnesium hydroxide into precipitated nesquehonite.

The magnesium hydroxide is preferably in the form of a suspension, and consists of water, magnesium hydroxide, unreacted magnesium oxide and impurities normally associated with magnesium hydroxide suspensions, for example, silica, calcium oxide, calcium hydroxide and other magnesium compounds such as magnesium carbonate etc.

In a preferred embodiment, said suspension has an overall solids content of at most 20 wt.-%, preferably of at most 15 wt.-%, more preferably of at most 10 wt.-% and most preferably of between 1 wt.-% and 8.5 wt.-%, based on the total weight of the suspension.

In the case where the suspension comprising magnesium hydroxide and magnesium oxide is obtained from magnesite as the at least one magnesium oxide source, the solid content of said suspension is preferably in the range between 2 wt.-% and 8 wt.-%, more preferably in the range between 3 wt.-% and 7 wt.-% and most preferably in the range between 4 wt.-% and 6 wt.-%, for example in the range between 4.5 wt.-% and 5.5 wt.-%, based on the total weight of the suspension obtained in step c). If the suspension comprising magnesium hydroxide and magnesium oxide is obtained from dolomite as the at least one magnesium oxide source of step a), the solid content of magnesium hydroxide and magnesium oxide in said suspension is preferably in the range between 1 wt.-% and 10 wt.-%, more preferably in the range between 2.5 wt.-% and 5 wt.-% and most preferably in the range between 3 wt.-% and 5 wt.-%, for example in the range between 3.5 wt.-% and 4.5 wt.-%, based on the total weight of the suspension obtained in step c).

In one preferred embodiment, said suspension obtained by slaking of dolomite as the at least one magnesium oxide source provided in step a) further comprises calcium hydroxide. In this case, the solid content of calcium hydroxide in the suspension is preferably in the range between 1 wt.-% and 10 wt.-%, more preferably in the range between 2.5 wt.-% and 5 wt.-% and most preferably in the range between 3 wt.-% and 5 wt.-%, for example in the range between 3.5 wt.-% and 4.5 wt.-%, based on the total weight of the suspension obtained in step c). In another preferred embodiment, the solid content of said suspension comprising magnesium hydroxide, magnesium oxide and calcium hydroxide is preferably in the range between 2 wt.-% and 20 wt.-%, more preferably in the range between 2 wt.-% and 10 wt.-%, even more preferably in the range between 5 wt.-% and 10 wt.-% and most preferably in the range between 6 wt.-% and 10 wt.-%, for example in the range between 7 wt.-% and 9 wt.-%, based on the total weight of the suspension obtained in step c).

Additionally or alternatively, the ratio of magnesium oxide and magnesium hydroxide to calcium hydroxide in the suspension obtained by slaking of burned dolomite as the at least one magnesium oxide source in step c) of the process of the present invention may vary in a wide range. However, in case the suspension of step c) is obtained from burned dolomite as the at least one magnesium oxide source provided in step a), the ratio of magnesium oxide and magnesium hydroxide to calcium hydroxide in the obtained suspension is preferably such that the ratio (weight of magnesium oxide and magnesium hydroxide):(weight of calcium hydroxide) is from 2:1 to 1:2, more preferably 1.5:1 to 1:1.5 and most preferably about 1:1.

In an optional embodiment, the particles of the obtained mixture of magnesium hydroxide and magnesium oxide in the suspension may be separated by their particle size or from impurities prior to process step d). Preferably, the magnesium hydroxide is separated from particles having a particle size larger than 300 μm and more preferably from particles having a particle size larger than 200 μm by separation technologies known to the skilled person, for example, by vibrating screens and the like.

Step d) involves contacting the suspension of magnesium hydroxide and magnesium oxide obtained in step c) with sufficient gaseous $CO_2$ and/or carbonate-comprising anions provided in step b) until at least a part of the provided magnesium hydroxide is converted to a crystalline magnesium carbonate precipitate (precipitated magnesium carbonate). In this context, it is to be noted, that the formation of said crystalline magnesium carbonate precipitate may lead to a conversion of remaining magnesium oxide in the suspension to magnesium hydroxide, which may be further converted to said crystalline magnesium carbonate precipitate by contacting the obtained magnesium hydroxide with sufficient gaseous $CO_2$ and/or carbonate-comprising anions provided in step b). The carbonation is continued until substantially all of the magnesium is precipitated, so that the suspension is composed almost entirely of a crystalline magnesium carbonate precipitate. Said crystalline magnesium carbonate precipitate is characterized as being nesquehonite having the formula $Mg(HCO_3)(OH).2H_2O$, which may also be described as being $MgCO_3.3H_2O$. The precipitated nesquehonite crystals obtained are of a prismatic elongated type being typical for nesquehonite.

For contacting the suspension comprising magnesium hydroxide and magnesium oxide obtained in step c) with said gaseous $CO_2$ of step b), the gas is preferably bubbled through the suspension. By bubbling the gaseous $CO_2$ through the suspension, a sufficient mixing may be achieved by the flow of the gas in the suspension, so that an additional agitation is not required. Additionally or alternatively, the suspension comprising magnesium hydroxide and magnesium oxide is agitated, which may provide a more thorough mixing and thus a shorter period of time for completing the conversion of magnesium hydroxide into magnesium carbonate, namely precipitated nesquehonite. In a preferred embodiment, the suspension comprising magnesium hydroxide and magnesium oxide is additionally agitated to ensure a thorough mixing of the particles in order to provide a sufficient amount of unreacted magnesium hydroxide particles for contacting the particles with said $CO_2$. Such agitation can be carried out continuously or discontinuously as long as the mixing provides a sufficient conversion of magnesium hydroxide into magnesium carbonate. In one preferred embodiment, the suspension is preferably agitated continuously.

In one preferred embodiment, said gaseous $CO_2$ is preferably added to the suspension comprising magnesium hydroxide and magnesium oxide by bubbling the carbon dioxide through the suspension in a constant rate. Said rate is preferably in the range between 0.1 and 10 kg $CO_2$/h per kg magnesium oxide, more preferably in the range between 0.2 and 5 kg $CO_2$/h per kg magnesium oxide and most preferably in the range between 0.5 and 2 kg $CO_2$/h per kg magnesium oxide.

Preferably, the ratio of suspension comprising magnesium hydroxide and magnesium oxide to gaseous $CO_2$ in the aqueous suspension is, in terms of volume, such that the ratio (volume of suspension):(volume of gaseous $CO_2$) is from 1:0.5 to 1:10 and more preferably 1:0.5 to 1:5. In one preferred embodiment, the ratio of magnesium hydroxide in the suspension to gaseous $CO_2$ is, in terms of volume, such that the ratio (volume of magnesium hydroxide):(volume of gaseous $CO_2$) is from 1:2 to 1:100 and more preferably 1:5 to 1:50.

In one preferred embodiment, the carbonation; i.e. the conversion of magnesium hydroxide is monitored by the change of the pH value and/or the electrical conductivity and/or temperature and/or $CO_2$ content in the offgas in order to control the progress or completion of the reaction.

For instance, if said crystalline magnesium carbonate precipitate is obtained from caustic calcined magnesite as the at least one magnesium oxide source provided in step a), the pH of the suspension comprising magnesium oxide and magnesium hydroxide prior to step d) of the process of the present invention is preferably in the range between pH 10 and 12, approximately about pH 11. In one preferred embodiment, the pH of said suspension decreases during contacting the obtained magnesium hydroxide of step c) with said gaseous $CO_2$ of step b) such that the obtained suspension after carrying out process step d) has a pH in the range between 7 and 8, approximately between pH 7.5 and 8.

By contrast, if said crystalline magnesium carbonate precipitate is obtained from burned dolomite as the at least one magnesium oxide source provided in step a), the pH of the suspension comprising magnesium oxide and magnesium hydroxide and calcium hydroxide prior to step d) of the process of the present invention is preferably above pH 11, approximately about pH 12. In one preferred embodiment, the pH of said suspension decreases during contacting the obtained magnesium hydroxide of step c) with said gaseous $CO_2$ of step b) such that the obtained suspension after carrying out process step d) has a pH in the range between 7 and 8, approximately between pH 7.5 and 8.

The temperature provided at the beginning of step d) of the present invention is decisive for controlling the formation of the resulting precipitated nesquehonite or its properties even though the temperature employed may vary within a specific range. For example, the starting temperature of the carbonation step provided in step d) may be adjusted to a temperature in the range between 5° C. and 35° C. and most preferably in the range between 10° C. and 30° C.

The temperature in the suspension may preferably be controlled and maintained at said starting temperature while step d) is carried out. In this respect, it is to be noted that the term "the temperature is maintained" during said process step in the meaning of the present invention relates to a temperature which does preferably not exceed the starting temperature by more than 5° C.; i.e. if the starting temperature is for example adjusted to a temperature of 25° C., the temperature during the process step may not exceed 30° C. For example, if the at least one magnesium oxide source provided in step a) is caustic calcined magnesite obtained by calcining magnesite, said starting temperature at the beginning of process step d) is preferably in the range between 20° C. and 28° C. and most preferably in the range between 24° C. and 26° C. During step d) is carried out, the temperature is preferably controlled and maintained between 20° C. and 25° C. As another example, if the at least one magnesium oxide source provided in step a) is burned dolomite obtained by calcining dolomite, said starting temperature at the beginning of process step d) is preferably in the range between 20° C. and 28° C. and most preferably in the range between 24° C. and 26° C. During step d) is carried out, the temperature is preferably controlled and maintained between 20° C. and 30° C.

In another preferred embodiment, the starting temperature of process step d) is allowed to rise while step d) is carried out. However, due to the exothermic reaction the temperature of the reaction mixture may rise to temperatures of 50° C. and more. The maximum temperature in this embodiment of the process is preferably not more than 50° C. and most preferably the maximum temperature reached during step d) is not more than about 45° C. If the temperature is allowed to rise during step d) is carried out, the starting temperature adjusted is preferably in the range of between 5° C. and 15° C. Such setting is preferably applied if the at least one magnesium oxide source provided in step a) is selected from dolomite, huntite and mixtures thereof. For example, if the at least one magnesium oxide source provided in step a) is burned dolomite obtained by calcining dolomite, said starting temperature during step d) of the process of the present invention is preferably in the range between 7° C. and 15° C., more preferably in the range between 10° C. and 15° C. and most preferably in the range between 11° C. and 13° C. During step d) is carried out, the temperature is allowed to rise such that the temperature rises to a maximum temperature of at most 50° C., preferably between 40° C. and 45° C.

In case the suspension comprising magnesium hydroxide and magnesium oxide obtained in step c) is contacted with said carbonate-comprising anions of step b), the carbonate-comprising anions are preferably added to said suspension in any appropriate solid form, e.g. in the form of granules or a powder or in the form of a suspension or solution. In one preferred embodiment, the suspension comprising magnesium hydroxide and magnesium oxide is agitated during the addition of the carbonate-comprising anions, which may provide a more thorough mixing and thus a shorter period of time for completing the conversion of magnesium hydroxide into magnesium carbonate, namely precipitated nesquehonite. Such agitation can be carried out continuously or discontinuously as long as the mixing provides a sufficient conversion of magnesium hydroxide into magnesium carbonate. In one preferred embodiment, the suspension is preferably agitated continuously.

Preferably, the concentration of the carbonate-comprising anions in the suspension comprising magnesium oxide and magnesium hydroxide is such that the weight ratio of said suspension:carbonate-comprising anions is from 300:1 to 10:1, more preferably 250:1 to 25:1, and even more preferably 200:1 to 50:1.

By carrying out step d) of the process of the present invention a precipitated intermediate product is obtained by contacting the obtained suspension of magnesium hydroxide of step c) with the gaseous $CO_2$ and/or carbonate-comprising anions of step b). Said precipitated intermediate product is characterized as being nesquehonite having the formula $Mg(HCO_3)(OH).2H_2O$, which may also be described as being $MgCO_3.3H_2O$. The precipitated nesquehonite crystals obtained are of a prismatic elongated type being typical for nesquehonite.

Accordingly, the time required for carrying out the carbonation of step d) is the time required to almost complete the conversion of the magnesium hydroxide obtained in step c) into precipitated nesquehonite. Such almost complete conversion of magnesium hydroxide into precipitated nesquehonite is preferably obtained within 4 hours, more preferably within 3 hours, even more preferably within 2 hours and most preferably within 90 min, calculated from the start of contacting the at least partially obtained magnesium hydroxide of step c) with said gaseous $CO_2$ and/or carbonate-comprising anions.

The precipitated nesquehonite obtained is preferably in the form of an aqueous suspension. It has been found that a suspension of precipitated nesquehonite having a solid content in the suspension of up to 50 wt.-%, preferably between 1 and 50 wt.-%, more preferably between 1 and 25 wt.-% and most preferably between 5 and 15 wt.-%, based on the total weight of the suspension, is preferred. In the case where the obtained suspension has a solid content above or below the desired range the suspension may be diluted with water or up-concentrated by any conventional process known to the skilled person to obtain a suspension of said desired solid content for the further process step.

In an optional embodiment, the particles of the obtained precipitated nesquehonite in the suspension may be separated by their particle size or from impurities prior to the heat-aging step. In one preferred embodiment, the precipitated nesquehonite is separated from particles having an average particle size $d_{50}$ value of more than 200 μm, more preferably from particles having an average particle size $d_{50}$ value of more than 150 μm and most preferably from particles having an average particle size $d_{50}$ value of more than 100 μm, as measured by screening and determining mass fractions of selected size ranges.

In this context, it is to be noted that the average particle size $d_{50}$ value of the obtained precipitated nesquehonite may vary in a broad range but, in general, the particles of the obtained precipitated nesquehonite have an average particle size $d_{50}$ value of less than 50 μm, more preferably of less than 35 μm, even more preferably of less than 20 μm and most preferably of less than 15 μm, as determined by laser diffraction using the instrument CILAS 920 particle-size-analyzer of CILAS, Orleans, France.

For example, if the at least one magnesium oxide source is derived from magnesite in the form of caustic calcined magnesite, the particles of the obtained precipitated nesquehonite in the suspension preferably have an average particle size $d_{50}$ value of less than 30 μm, more preferably of less than 25 nm, even more preferably of less than 20 μm and most preferably between 10 μm and 15 μm, as determined by laser diffraction using the instrument CILAS 920 particle-size-analyzer of CILAS, Orleans, France.

By contrast, if the precipitated nesquehonite of step d) is obtained from burned dolomite as the at least one magnesium oxide source provided in step a), the suspension obtained in step d) may further comprise precipitated calcium carbonate (PCC). In this case, the mixture of the obtained particles of precipitated nesquehonite and precipitated calcium carbonate in the suspension preferably have an overall average particle size $d_{50}$ value of less than 20 μm, more preferably of less than 15 μm, even more preferably of less than 10 μm and most preferably of less than 7.5 μm, for example less than 5 μm, as determined by laser diffraction by using the instrument CILAS 920 particle-size-analyzer of CILAS, Orleans, France.

In an especially preferred embodiment, the particles of the obtained precipitated nesquehonite in the suspension are ground prior to the heat-aging step in order to provide particles having a reduced particle size and/or in order to provide particles of about equal diameter. The grinding step can be carried out with any conventional grinding device such as a grinding mill known to the skilled person. In one preferred embodiment, the precipitated nesquehonite particles in the aqueous suspension are wet-ground in a vertical bead mill. Preferably, said wet-grinding is carried out at a specific energy input during grinding in the range between 10 kWh/dry ton to 500 kWh/dry ton, more preferably at a specific energy input during grinding in the range between 20 kWh/dry ton to 300 kWh/dry ton and most preferably at a specific energy input during grinding in the range between 50 kWh/dry ton to 200 kWh/dry ton, for example at a specific energy input during grinding of about 100 kWh/dry ton.

The intermediate grinding step is especially advantageous if the magnesium oxide source is derived from magnesite in the form of caustic calcined magnesite. Accordingly, if the precipitated nesquehonite particles are ground prior to the heat-aging of step e) of the process of the present invention, the nesquehonite particles obtained from caustic calcined magnesite as the at least one magnesium oxide source of step a) preferably have an average particle size $d_{50}$ value of less than 25 μm, more preferably of less than 20 μm, even more preferably of less than 15 μm and most preferably of less than 10 μm, as determined by laser diffraction using the instrument CILAS 920 particle-size-analyzer of CILAS, Orleans, France.

However, in case where the mixture of particles of precipitated nesquehonite and precipitated calcium carbonate obtained from burned dolomite as the at least one magnesium oxide source of step a) is ground prior to the heat-aging step, the particles in the obtained mixture of precipitated nesquehonite and precipitated calcium carbonate preferably have an overall average particle size $d_{50}$ value of less than 10 μm, more preferably of less than 7.5 μm, even more preferably of less than 5 μm and most preferably of less than 3 μm, for example less than 2.5 μm, as determined by laser diffraction by using the instrument CILAS 920 particle-size-analyzer of CILAS, Orleans, France.

It is further to be noted that if the precipitated nesquehonite of step d) is obtained from burned dolomite as the at least one magnesium oxide source provided in step a), the ratio of precipitated nesquehonite and precipitated calcium carbonate in the suspension obtained in step d) of the process of the present invention may vary in a wide range. Preferably, the ratio of precipitated nesquehonite to precipitated calcium carbonate in the obtained suspension is preferably such that the ratio (weight of precipitated nesquehonite):(weight of precipitated calcium carbonate) is from 3:1 to 1:3, more preferably 2:1 to 1:2 and most preferably from 1.5:1 to 1:1.5.

Additionally or alternatively, a polysaccharide may be added into the suspension before step d) of the process of the present invention is carried out; i.e. the suspension containing the at least one magnesium oxide source contains said polysaccharide during the carbonation of step d). The polysaccharide is preferably selected from the group consisting of sorbitol, mannitol, sucrose and mixtures thereof. In one preferred embodiment, the polysaccharide is sorbitol.

The polysaccharide is preferably added into the suspension in a quantity so that it is contained in the resulting suspension in a concentration between 0.001 wt.-% and 5 wt.-%, more preferably between 0.01 wt.-% and 0.1 wt.-% and most preferably between 0.05 wt.-% and 0.75 wt.-%, based on the total weight of the suspension.

The polysaccharide can be added to the suspension in any appropriate solid form, e.g. in the form of granules or a powder. Alternatively, the polysaccharide can be added to the suspension in the form of a suspension or solution.

Characterization of Step e): Treating the Obtained Precipitated Nesquehonite in a Heat-ageing Step According to step e) of the process of the present invention, said obtained precipitated nesquehonite of step d) is treated by a heat-aging in order to obtain the hydromagnesite.

The term "heat-aging" in the meaning of the present invention relates to a thermal process in which crystals, such as of nesquehonite, having initially a higher internal energy state, undergo a phase transformation by dissolving and redepositing into crystals having a lower internal energy state. The process results in a final crystal product characterized by greater perfection of its crystal lattice structure, a narrower particle size distribution, greater degree of particle discreteness and lower surface energy.

The heat-aging of the precipitated nesquehonite obtained in step d) may be carried out at temperatures of above 90° C. and most preferably at a temperature in the range between 90° C. and 150° C., wherein said temperature range reflects the period required for converting the obtained precipitated nesquehonite into hydromagnesite; i.e. the higher the temperature at which the heat-aging is carried out the lower the time required for achieving an almost complete conversion of precipitated nesquehonite into hydromagnesite or the lower the temperature at which the heat-aging is carried out the higher the time required for achieving an almost complete conversion of precipitated nesquehonite into hydromagnesite. Preferably, the precipitated nesquehonite is maintained at the heat-aging temperature for a sufficient time to cause the morphology of the nesquehonite to rearrange to the final form of the final product hydromagnesite. In this respect, the period required for achieving an almost complete conversion into hydromagnesite starting from the precipitated nesquehonite may vary between 10 min and several hours depending on the temperature applied during said heat-aging step.

The period of time the precipitated nesquehonite should be maintained at the heat-aging temperature in order to recrystallize to the new morphology having decreased particle size is determined by both the initial morphology of the precipitated nesquehonite and the nature and extent of any impurities present in the magnesium carbonate. For example, where the precipitated nesquehonite material has a small initial average particle size, the period of time for said aging step at about 130° C. is as short as, for example, about 30 minutes.

In order to arrive at specifically small particles of hydromagnesite the heat-aging process for converting the precipitated nesquehonite into hydromagnesite is preferably carried out at temperatures is in the range between 90° C. and 150° C., preferably in the range between 110° C. and 140° C., more preferably in the range between 120° C. to 135° C. and most preferably at a temperature of about 130° C.

For instance, if the heat-aging temperature of the precipitated nesquehonite is adjusted to a temperature of about 130° C., said temperature is preferably maintained for a period of time of more than 10 min and more preferably for a period of time of between 20 min and 60 min. in one preferred embodiment, the heat-aging temperature is maintained for a period of time of between 20 min and 40 min, more preferably for a period of time of between 25 and 35 min and most preferably for about 30 min. The heat-aging reaction can be monitored by measuring the surface area and/or conductivity of the hydromagnesite at specific intervals.

In an optional embodiment, a bleaching agent is added into the suspension of nesquehonite obtained in step d); i.e. said bleaching agent is added prior the heat-aging of step e) is carried out. Additionally or alternatively, the bleaching agent may be added during the carbonation step, i.e. during the step in which the obtained magnesium hydroxide of step c) is contacted with the gaseous $CO_2$ of step b).

In one preferred embodiment, the bleaching agent is sodium dithionite. In a further preferred embodiment, the bleaching agent is formamidine sulfinic acid. Alternatively or additionally other suitable bleaching agents may be used.

The bleaching agent is preferably added into the corresponding suspension in a quantity so that it is contained in the resulting suspension of magnesium hydroxide and precipitated nesquehonite, respectively, in a concentration between 0.001 wt.-% and 10 wt.-%, more preferably between 0.01 wt.-% and 1 wt.-% and most preferably between 0.05 wt.-% and 0.5 wt.-%, based on the total weight of the suspension.

The bleaching agent can be added to the corresponding suspension in any appropriate solid form, e.g. in the form of granules or a powder. Alternatively, the bleaching agent can be added to the corresponding suspension in the form of a suspension or solution.

By using the process of the present invention, it is possible to provide hydromagnesite particles having a specifically decreased particle size. Preferably the obtained hydromagnesite particles have an average particle size $d_{50}$ value in the range of less than 20 µm, preferably of less than 15 µm, more preferably of less than 10 µm and most preferably of less than 5 µm, as determined by laser diffraction using the instrument CILAS 920 particle-size-analyzer of CILAS, Orleans, France.

In one preferred embodiments, it is possible to obtain a hydromagnesite suspension having a high content of hydromagnesite if said hydromagnesite is obtained from a magnesium oxide source in the form of magnesium oxide and/or a magnesium oxide containing mineral having a high content of magnesium oxide and/or a magnesium containing material having a high content of a magnesium compound which can be converted into magnesium oxide. Said content of hydromagnesite is preferably above 85 wt.-%, more preferably above 90 wt.-% and most preferably above 95 wt.-%, based on the total weight of the solid content in the suspension. For example, if magnesite is used as the at least one magnesium oxide source provided in step a), the content of hydromagnesite is preferably above 90 wt.-%, more preferably above 93.5 wt.-% and most preferably above 97 wt.-%, based on the total weight of the solid content in the suspension.

Furthermore, if said hydromagnesite is obtained from a magnesium oxide source in the form of magnesium oxide and/or a magnesium oxide containing mineral having a high content of magnesium oxide and/or a magnesium containing material having a high content of a magnesium compound which can be converted into magnesium oxide, said process provides hydromagnesite particles having a specifically decreased particle size. Preferably the obtained hydromagnesite particles have an average particle size $d_{50}$ value in the range of less than 20 µm, preferably in the range of 0.1 µm to 15 µm, more preferably in the range of 0.5 µm to 10 µm, and most preferably in the range of 1 µm to 5 µm, for example in the range between 4.75 µm to 5 µm, as determined by laser diffraction using the instrument CILAS 920 particle-size-analyzer of CILAS, Orleans, France. Additionally, by using the process of the present invention, the particles obtained are preferably of a platy-like morphology. Particles having the foregoing characteristics are preferably obtained if the at least one magnesium oxide source of step a) in the form of magnesium oxide and/or a magnesium oxide containing mineral having a high content of magnesium oxide and/or a magnesium containing material having a high content of a magnesium compound which can be converted into magnesium oxide is selected from magnesium oxide, periclase, magnesite, magnesium carbonate, magnesium hydroxide and mixtures thereof.

In a preferred embodiment, particles having the foregoing characteristics are preferably obtained if the at least one magnesium oxide source of step a) is magnesite and most preferably magnesite in the form of caustic calcined magnesite.

If said hydromagnesite is obtained from a magnesium oxide source in the form of a magnesium oxide containing mineral having a low content of magnesium oxide and/or a magnesium containing material having a low content of a magnesium compound which can be converted into magnesium oxide, the content of the hydromagnesite in the resulting suspension is preferably in the range between 20 wt.-% and 70 wt.-%, based on the total weight of the solid content in the suspension. In the case where the hydromagnesite is obtained from dolomite, the content of the hydromagnesite in the resulting suspension may be for example in the range between 30 wt.-% and 60 wt.-% and more preferably in the range between 35 wt.-% and 50 wt.-%, based on the total weight of the solid content in the suspension.

Additionally, if the at least one magnesium oxide source provided in step a) is dolomite, it is to be noted that by using the process of the present invention, hydromagnesite is obtained in admixture with precipitated calcium carbonate, wherein the obtained composition comprises hydromagnesite having a platy-like morphology and precipitated calcium carbonate having a colloidal morphology.

In the case where hydromagnesite is obtained in admixture with precipitated calcium carbonate, the content of the precipitated calcium carbonate in the resulting suspension may be for example in the range between 40 wt.-% and 70 wt.-% and more preferably in the range between 50 wt.-% and 65 wt.-%, based on the total weight of the solid content in the suspension.

Furthermore, by using the inventive process, it is possible to obtain hydromagnesite particles in admixture with other particles having a decreased particle size if said hydromagnesite is obtained from a magnesium oxide source in the form of a magnesium oxide containing mineral having a low content of magnesium oxide and/or a magnesium containing material having a low content of a magnesium compound which can be converted into magnesium oxide. Said process preferably provides hydromagnesite particles in admixture with other particles having an average particle size $d_{50}$ value in the range of up to 15 rpm, preferably in the range of 0.1 µm to 10 µm, more preferably in the range of 0.5 µm to 5 µm and most preferably in the range of 1 µm to 4 µm, for example, in the range between 3.25 µm and 3.5 µm, as determined by laser diffraction using the instrument CILAS 920 particle-size-analyzer of CILAS, Orleans, France. Particles having said characteristics are preferably obtained if the at least one magnesium oxide source of step a) is selected from dolomite, huntite and mixtures thereof.

In a preferred embodiment, particles having the foregoing characteristics are preferably obtained if the at least one magnesium oxide source of step a) is dolomite and most preferably dolomite in the form of burned dolomite and/or half-burned dolomite.

In a preferred embodiment, the obtained hydromagnesite of the present invention is preferably in the form of a suspension, wherein the solid content can be adjusted to any solid content suitable for application in the paper, paint, rubber and plastics industries. In this respect, it is to be noted that the obtained hydromagnesite can be used directly without carrying out further treatment steps.

In one preferred embodiment, hydromagnesite in the form of a suspension has a solid content of up to 30 wt.-%, preferably between 1 wt.-% and 20 wt.-%, more preferably between 5 wt.-% and 15 wt.-% and most preferably between 7 wt.-% and 11 wt.-%, based on the total weight of the suspension.

In another preferred embodiment, said suspension preferably has a pH value in the range of 6 to 11, preferably a pH value of 7 to 10.5 and more preferably a pH value of 8.5 to 10.5. The viscosity is preferably less than 2.500 nmPa·s, more preferably less than 2.000 mPa·s and most preferably less than 1.750 mPa·s, as measured with a Brookfield DV-II Viscometer at a speed of 100 rpm and equipped with a LV-3 spindle.

In a preferred embodiment, the aqueous phase of the obtained hydromagnesite suspension may be replaced with deionised water. In an optional embodiment, the obtained hydromagnesite suspension may be concentrated, optionally up to the point of obtaining a dry hydromagnesite product. If the aqueous suspension described above is dried, the obtained solids (i.e. dry or containing as little water that it is not in a fluid form) of hydromagnesite may be in the form of granules or a powder. In the case of a dry product, this product may additionally be treated with fatty acids during and/or before and/or after drying. Said fatty acids are preferably selected from stearic acid, palmitic acid, behenic acid, montanic acid, capric acid, lauric acid, myristic acid, isostearic acid and cerotic acid.

The hydromagnesite obtained from magnesium oxide sources by the process of the present invention are of distinct platy-like morphology in combination with specifically decreased particle size and, thus, allows for easy and economic applications in the paper, paint, rubber and plastics industries. The particles of the hydromagnesite obtained according to the present invention, have a particle size distribution, wherein the obtained particles have an average particle size $d_{50}$ value in the range of less than 20 µm, preferably of less than 15 µm, more preferably of less than 10 µm and most preferably of less than 5 µm. In a preferred embodiment, the process of the present invention may provide hydromagnesite particles having an average particle size $d_{50}$ value of less than 20 µma, preferably in the range of 0.1 µm to 15 µm, more preferably in the range of 0.5 µm to 10 µm, and most preferably in the range of 1 µm to 5 µm, for example in the range between 4.75 µm to 5 µm. In another preferred embodiment, the process of the present invention may provide hydromagnesite particles having an average particle size $d_{50}$ value in the range of up to 15 µm, preferably in the range of 0.1 µm to 10 µm, more preferably in the range of 0.5 µm to 5 µm and most preferably in the range of 1 µm to 4 µm, for example, in the range between 3.25 µm and 3.5 µm, as determined by laser diffraction using the instrument CILAS 920 particle-size-analyzer of CILAS, Orleans, France.

In one preferred embodiment, the obtained hydromagnesite provides or shows an absolute density of above 2.25 g/cm$^3$, more preferably the density is between 2.26 g/cm$^3$ and 2.40 g/cm$^3$, even more preferably the density is between 2.26 g/cm$^3$ and 2.35 g/cm$^3$ and most preferably the density is between 2.26 g/cm$^3$ and 2.32 g/cm$^3$. For example, if the hydromagnesite is obtained from caustic calcined magnesite as the at least one magnesium oxide source provided in step a), the density of the hydromagnesite may be about 2.29 g/cm$^3$.

In another preferred embodiment, the obtained hydromagnesite provides a specific BET surface area of 10 m$^2$/g to 150 m$^2$/g, more preferably 10 m$^2$/g to 100 m$^2$/g and most preferably 20 m$^2$/g to 70 m$^2$/g, as measured using nitrogen and the BET method according to ISO 9277.

For example, if the hydromagnesite is obtained from caustic calcined magnesite as the at least one magnesium oxide source provided in step a) said hydromagnesite preferably features a specific BET surface area of 10 m$^2$/g to 70 m$^2$/g, more preferably of 20 m$^2$/g to 50 m$^2$/g and most preferably of 25 m$^2$/g to 40 m$^2$/g, for example of 30 m$^2$/g to 35 m$^2$/g, as measured using nitrogen and the BET method according to ISO 9277. In the case where the hydromagnesite is obtained from burned dolomite as the at least one magnesium oxide source provided in step a), i.e. the resulting suspension of step e) also comprises precipitated calcium carbonate, said composition preferably features a specific BET surface area of 40 m$^2$/g to 100 m$^2$/g, more preferably of 45 m$^2$/g to 80 m$^2$/g and most preferably of 50 m$^2$/g to 70 m$^2$/g, for example of 55 m$^2$/g to 65 m$^2$/g, as measured using nitrogen and the BET method according to ISO 9277.

In another preferred embodiment, the obtained hydromagnesite has a specific BET surface area within the range of 20 to 50 m$^2$/g and the particles have an average particle size $d_{50}$ value of less than 20 µm, preferably in the range of 0.1 µm to 15 µm, more preferably in the range of 0.5 µm to 10 µm, and most preferably in the range of 1 µm to 5 µm, for example, in the range between 4.75 µm to 5 µm, as determined by laser diffraction using the instrument CILAS 920 particle-size-analyzer of CILAS, Orleans, France.

Even more preferably the specific BET surface area is within the range of 45 to 80 m$^2$/g and the particles have a average particle size $d_{50}$ value in the range of up to 15 µm, preferably in the range of 0.1 µm to 10 µm, more preferably in the range of 0.5 µm to 5 µm and most preferably in the range of 1 µm to 4 µm, for example, in the range between 3.25 µm and 3.5 µm, as determined by laser diffraction using the instrument CILAS 920 particle-size-analyzer of CILAS, Orleans, France.

Furthermore, it is preferred that the obtained hydromagnesite has a degree of whiteness R457, measured in accordance with the ISO 2469 Standard, of at least 80%, more preferably of at least 85%, even more preferably of between 85% and 99% and most preferably of between 85% and 99%. In another preferred embodiment, the obtained hydromagnesite has a degree of whiteness R457, measured in accordance with the ISO 2469 Standard, of at least 89% and more preferably between 89% and 99%. In a further preferred embodiment, the obtained hydromagnesite has a degree of whiteness R457, measured in accordance with the ISO 2469 Standard, of at least 93%. Additionally or alternatively, the hydromagnesite obtained by the process of the process of the present invention has a Yellowness Index according to DIN 6167 of less than 5, more preferably of less than 4 and most preferably of less than 3.

If the hydromagnesite is provided in the form of a suspension, said hydromagnesite is optionally dispersed. Conventional dispersants known to the skilled person can be used. The dispersant can be anionic or cationic. A preferred dispersant is one based on polyacrylic acid. Such dispersants are preferably dosed so as to account for about 0.3 wt.-% to about 3 wt.-%, based on the total weight of said hydromagnesite.

The hydromagnesite thus obtained may be used in paper, tissue paper, plastics or paints. In particular, said hydromagnesite can be used as mineral filler and/or for coating of paper and in particular as mineral filler in paper wrappers for smoking articles. In particular, coating compositions and/or mineral filler compositions according to the invention are characterized in that they contain hydromagnesite obtained by the process of the present invention and in that they provide improved optical properties in comparison to compositions comprising hydromagnesite of the prior art. Papers and in particular paper wrapper for smoking articles manufactured and/or coated are characterized in that they contain said hydromagnesite obtained by the process of the present invention. As another advantage, the hydromagnesite obtained by the process of the present invention can be used directly in a paper making application without the removal of, for example, impurities such as other salts or colored compounds. Furthermore, the obtained hydromagnesite may be used as flame-retardants having non-conductive properties and further functions as electrical insulators. Such flame-retardants may be incorporated in electric and electronic parts, constructional materials, waste pipes, gutter, automobile parts, cabinets for televisions, computers and similar equipments, profiles and fittings such as fittings for cables, electric switches, sealants, plasters and paints. Flame-retardants comprising hydromagnesite may thus preferably used in building industry, ships, aircrafts, trains and vehicles.

The following examples may additionally illustrate the invention, but are not meant to restrict the invention to the exemplified embodiments. The examples below show the good optical properties such as opacity of the calcium carbonate suspensions according to the present invention:

EXAMPLES

Measurement Methods

The following measurement methods are used to evaluate the parameters given in the examples and claims.

Brookfield Viscosity

The Brookfield-viscosity of a slurry was determined with a Brookfield Viscometer type RVT equipped with a LV-3 spindle at a speed of 100 rpm and room temperature (20±3° C.).

BET Specific Surface Area of a Material

The BET specific surface area is measured via the BET method according to ISO 4652 using nitrogen, following conditioning of the sample by heating at 250° C. for a period of 30 minutes. Prior to such measurements, the sample is filtered, rinsed and dried at 110° C. in an oven for at least 12 hours.

Particle Size Distribution (Mass % Particles with a Size <X) and Average Particle Size ($d_{50}$) of a Particulate Material The average particle size and the average particle size mass distribution of a particulate material are determined via laser diffraction, i.e. the light from a laser passes though a suspension and the particle size distribution is calculated from the resulting diffraction pattern. The measurement is made with a CILAS 920 particle-size-analyzer of CILAS, Orleans, France.

The method is well known to the skilled person and is commonly used to determine the particle size distribution of particulate materials. The measurement is carried out by diluting the corresponding suspension (deionised water; solution of 0.1 wt.-% of sodium pyrophosphate). The samples were dispersed using a high speed stirrer and ultrasonic.

pH of an Aqueous Suspension

The pH of the aqueous suspension is measured using a standard pH-meter at approximately 22° C.

Density of Solid Particles

The density of the product is measured using the standard density analyzer Micromeritics AccuPyc® commercialized by Micromeritics.

Solids Content of an Aqueous Suspension

The suspension solids content (also known as "dry weight") is determined using a Moisture Analyser HR73 commercialized by Mettler-Toledo with the following settings: temperature of 120° C., automatic switch off 3, standard drying, 5-20 g of suspension.

Comparative Example

The following comparative example illustrates the preparation of hydromagnesite by a process of the prior art. Said process is carried out by slaking caustic calcined magnesite and contacting the obtained magnesium hydroxide with gaseous $CO_2$ to convert the obtained magnesium hydroxide into hydromagnesite, wherein the carbonation is carried out at a starting temperature of about 60° C.

90 kg of caustic calcined magnesite (Van Mannekus M95) were slaked by adding said magnesite to 1 700 liters of 40° C. tap water in a stirred reactor. The magnesite was slaked for 15 min under continuous stirring and the resulting suspension was adjusted to about 5% solids content via dilution with water. The carbonation was conducted in a 1 800 liter baffled cylindrical stainless steel reactor equipped with a gassing agitator, a stainless steel carbonation tube to direct a carbon dioxide/air gas stream to the impeller and probes for monitoring the pH and conductivity of the suspension. The suspension obtained in the slaking step was adjusted to a temperature of 60° C. and added to the carbonating reactor. A gas of 26% by volume of $CO_2$ in air was then bubbled upwards through the suspension at a rate of 200 m$^3$/h under a slurry agitation of 240 rpm. During the carbonation, the temperature of the reaction mixture was not controlled. After 85 minutes (calculated from start of introduction of said gas) the introduction of gas was stopped. The product was recovered as an aqueous suspension. Characteristics and physical properties are given in column A of table 1.

Example 1

The following illustrative example of the invention involves the preparation of hydromagnesite by slaking caustic calcined magnesite and contacting the obtained magnesium hydroxide with gaseous $CO_2$ to convert the obtained magnesium hydroxide into hydromagnesite, wherein the carbonation is carried out with a starting temperature of about 20° C. to 25° C. and a subsequent heat-aging step.

90 kg of caustic calcined magnesite (Van Mannekus M95) were slaked by adding said magnesite to 1 700 liters of 40° C. tap water in a stirred reactor. The magnesite was slaked for 15 min under continuous stirring and the resulting suspension was adjusted to about 5% solids content via dilution with water. The carbonation was conducted in a 1800 liter baffled cylindrical stainless steel reactor equipped with a gassing agitator, a stainless steel carbonation tube to direct a carbon dioxide/air gas stream to the impeller and probes for monitoring the pH and conductivity of the suspension. The suspension obtained in the slaking step was adjusted to a temperature of about 25° C. and added to the carbonating reactor. A gas of 26% by volume of CO2 in air was then bubbled upwards through the slurry at a rate of 200 m$^3$/h under a slurry agitation of 240 rpm. During the carbonation, the temperature of the reaction mix was controlled and maintained between 20-25° C. After 85 min (calculated from start of introduction of said gas) the introduction of gas was stopped. Immediately after carbonation, the resulting suspension was wet-ground in a vertical bead mill at a flow rate of 320 liters/h, resulting in a specific grinding energy consumption of about 100 kWh/dry ton. To the resulting suspension, 1.8 kg of Formamidine Sulfinic Acid (DegaFAS® from Degussa-Hills) was added. The slurry was then transferred to a pressurized vessel and heated to about 130° C. for 30 min. The product was recovered as an aqueous suspension. Characteristics and physical properties are given in column B of table 1.

Example 2

The following illustrative example of the invention involves the preparation of hydromagnesite by calcining and slaking white dolomite stone and contacting the obtained magnesium hydroxide with gaseous $CO_2$ to convert the obtained magnesium hydroxide into hydromagnesite, wherein the carbonation is carried out with a starting temperature of about 12° C. and a subsequent aging step.

White Dolomite stones (Hammerfall A/S) were crushed to yield a grain size of 10-50 mm and calcined in a rotary kiln at 1050° C. for 60 min. The resulting burned Dolomite (CaO.MgO) was ground in a ball mill to obtain a powder with mean particle size of about 40 μm (CILAS laser diffraction method).

200 kg of said burned Dolomite were slaked by adding to 1 000 liters of 50° C. tap water in a stirred reactor. The burned Dolomite was slaked for 30 min under continuous stirring and the resulting suspension was adjusted to about 8% solids content via dilution with water. The carbonation was conducted in a 1 800 liter baffled cylindrical stainless steel reactor equipped with a gassing agitator, a stainless steel carbonation tube to direct a carbon dioxide/air gas stream to the impeller and probes for monitoring the pH and conductivity of the suspension. 1 800 liters of the suspension obtained in the slaking step was adjusted to a temperature of 12° C. and added to the carbonating reactor. A gas of 26% by volume of CO2 in air was then bubbled upwards through the slurry at a rate of 200 m$^3$/h under a slurry agitation of 240 rpm. During the carbonation, the temperature of the reaction mix was not controlled and allowed to rise due to heat generated in the exothermic reaction. After 85 min (calculated from start of introduction of said gas) the introduction of gas was stopped. The suspension was then transferred to a pressurized vessel and heated to about 130° C. for 30 min. The product was recovered as an aqueous slurry. Characteristics and physical properties are given in column C of table 1.

TABLE 1

| physical data | | | | |
|---|---|---|---|---|
| | | column example | | |
| | | A comparative | B 1 | C 2 |
| specific surface area BET | m$^2$/g | 42.6 | 34.4 | 55.9 |
| PSD | | | | |
| avg. particle size d$_{50}$ | μm | 14.34 | 4.9 | 3.39 |
| CILAS 920 | | | | |
| brightness (DIN 53140) | | | | |
| R457 (ISO 2469) | % | 82.9 | 89.9 | 93.3 |
| yellow index (DIN 6167) | | 7.4 | 0.5 | 1.1 |
| solids content | % | 9.4 | 9.7 | 7.8 |
| viscosity (Brookfield 100 rpm) | mPas | 30 | 1600 | 780 |
| pH Slurry | | 7.3 | 9.4 | 10.2 |

TABLE 1-continued physical data

| | | | column example | | |
|---|---|---|---|---|---|
| | | | A comparative | B 1 | C 2 |
| mineralogical composition XRD | | | | | |
| Hydromagnesite | $Mg_5(CO_3)_4(OH)_2 \cdot 4(H_2O)$ | % | 90.8 | 98.3 | 35.7 |
| Nesquehonite | $Mg(HCO_3)(OH) \cdot 2(H_2O)$ | % | | | |
| Calcite | $CaCO_3$ | % | 1.1 | 1.6 | 58.2 |
| Dolomite | $CaMg[CO_3]_2$ | % | | | |
| Brucite | $Mg(OH)_2$ | % | 3.1 | | |
| Periclase | $MgO$ | % | 5 | 0.1 | |

As can be gathered from the data shown in table 1, the inventive method especially leads to products having a significantly lower particle size (average particle size $d_{50}$).

The invention claimed is:

1. A hydromagnesite suspension obtained by the process comprising the steps of:
    a) providing at least one magnesium oxide source, wherein the magnesium oxide source is a calcined, calcium magnesium carbonate;
    b) providing gaseous $CO_2$ and/or carbonate-comprising anions;
    c) slaking the magnesium oxide source of step a) in an aqueous environment to obtain a slaked product comprising magnesium hydroxide, calcium hydroxide and magnesium oxide;
    d) contacting the slaked product with the gaseous $CO_2$ and/or carbonate-comprising anions to obtain a product comprising precipitated nesquehonite and precipitated calcium carbonate; and
    e) treating the product comprising precipitated nesquehonite and precipitated calcium carbonate to heat-ageing to form a suspension comprising an admixture of hydromagnesite and precipitated calcium carbonate,
    wherein the suspension so obtained has (i) 30 to 60 wt. % of hydromagnesite based on the total weight of the solid contents of the suspension, (ii) 40 to 70 wt. % of precipitated calcium carbonate based on the total weight of the solids content of the suspension, (iii) hydromagnesite and precipitated calcium carbonate particles having an average particle size $d_{50}$ of 0.1 to 10 μm, and (iv) hydromagnesite and precipitated calcium carbonate particles having a specific BET surface area of 40 to 100 $m^2/g$.

2. The hydromagnesite suspension according to claim 1, wherein the calcined, calcium magnesium carbonate in step a) is dolomite, huntite or a mixture thereof that was calcined.

3. The hydromagnesite suspension according to claim 1, wherein the calcined, calcium magnesium carbonate in step a) is dolomite that was calcined.

4. The hydromagnesite suspension according to claim 3, wherein the dolomite was calcined at a temperature of between 900° C. and 1200° C.

5. The hydromagnesite suspension according to claim 3, wherein the dolomite was calcined at a temperature of between 600° C. and 900° C.

6. The hydromagnesite suspension according to claim 1, wherein gaseous $CO_2$ is provided in step b) from an external $CO_2$ supply or from the recirculation of $CO_2$ or both.

7. The hydromagnesite suspension according to claim 1, wherein carbonate-comprising anions are provided in step b) and are selected from the group consisting of sodium carbonate, potassium carbonate, sodium hydrogen carbonate, potassium hydrogen carbonate and mixtures thereof.

8. The hydromagnesite suspension according to claim 1, wherein step c) is performed at a temperature of between 35° C. and 60° C.

9. The hydromagnesite suspension according to claim 1, wherein step c) is performed for 5 min to 50 min.

10. The hydromagnesite suspension according to claim 1, wherein the weight ratio of magnesium oxide and magnesium hydroxide to the weight of calcium hydroxide in the slaked product obtained in step c) is 2:1 to 1:2.

11. The hydromagnesite suspension according to claim 1, wherein step d) is carried out at a temperature of between 10° C. and 30° C.

12. The hydromagnesite suspension according to claim 1, wherein step d) is carried out at a temperature of between 20° C. and 28° C.

13. The hydromagnesite suspension according to claim 1, wherein the starting temperature of step d) is between 7° C. and 15° C. and the temperature is permitted to raise during step d) to not more than 50° C.

14. The hydromagnesite suspension according to claim 1, wherein the product comprising precipitated nesquehonite and the precipitated calcium carbonate obtained in step d) has particles having an average particle size $d_{50}$ of 0.5 to 5 μm.

15. The hydromagnesite suspension according to claim 1, wherein the weight ratio of precipitated nesquehonite to precipitated calcium carbonate in the product obtained in step d) is from 3:1 to 1:3.

16. The hydromagnesite suspension according to claim 1, wherein the heat-ageing step e) is carried out at a temperature of between 90° C. and 150° C.

17. The hydromagnesite suspension according to claim 1, wherein the heat-ageing step e) is carried out at a temperature of between 110° C. and 140° C.

18. The hydromagnesite suspension according to claim 1, wherein the heat-ageing step e) is carried out at a temperature of between 120° C. and 135° C.

19. The hydromagnesite suspension according to claim 1, wherein the heat-ageing step e) is carried out for 20 min to 60 min.

20. The hydromagnesite suspension according to claim 1, wherein the heat-ageing step e) is carried out for 20 min to 40 min.

21. The hydromagnesite suspension according to claim 1, wherein the heat-ageing step e) is carried out for 25 min to 35 min.

22. The hydromagnesite suspension according to claim 1, wherein the composition obtained in step e) has 35 to 50 wt. % of hydromagnesite based on the total weight of the solids content of the suspension.

23. The hydromagnesite suspension according to claim 1, wherein the hydromagnesite and precipitated calcium carbonate particles of the suspension obtained in step e) have specific BET surface area of 45 to 80 $m^2/g$.

24. The hydromagnesite suspension according to claim 1, wherein the composition obtained in step e) comprises hydromagnesite and precipitated calcium carbonate particles having an average particle size d50 of 0.5 to 5 μm.

25. The hydromagnesite suspension according to claim 1, wherein the composition obtained in step e) comprises hydromagnesite and precipitated calcium carbonate particles having an average particle size d50 of 1 to 4 μm.

26. The hydromagnesite suspension according to claim 1, wherein the particles of the suspension obtained in step e) is treated further with one or more fatty acids.

27. The hydromagnesite suspension according to claim 26, wherein the one or more fatty acids is selected from the group consisting of stearic acid, palmitic acid, behenic acid, montanic acid, capric acid, lauric acid, myristic acid, isostearic acid and cerotic acid.

28. Paper comprising the hydromagnesite suspension according to claim 1.

29. A paper coating or mineral filler comprising the hydromagnesite suspension according to claim 1.

30. A paper wrapper for a smoking article comprising the hydromagnesite suspension according to claim 1.

31. A flame-retardant comprising the hydromagnesite suspension according to claim 1.

32. The flame-retardant according to claim 31, for use in electric and electronic parts, constructional materials, waste pipes, gutter, automobile parts, cabinets for televisions, computers, profiles and fittings, fittings for cables and electric switches, sealants, plasters or paints.

* * * * *